(12) United States Patent
Luszcz et al.

(10) Patent No.: US 10,346,367 B1
(45) Date of Patent: Jul. 9, 2019

(54) LOAD SHEDDING TECHNIQUES FOR DISTRIBUTED SERVICES WITH PERSISTENT CLIENT CONNECTIONS TO ENSURE QUALITY OF SERVICE

(71) Applicant: Amazon Technologies, Inc., Seattle, WA (US)

(72) Inventors: Jacob David Luszcz, Somerville, MA (US); Jacob A. Strauss, Boston, MA (US)

(73) Assignee: Amazon Technologies, Inc., Seattle, WA (US)

(*) Notice: Subject to any disclaimer, the term of this patent is extended or adjusted under 35 U.S.C. 154(b) by 615 days.

(21) Appl. No.: 14/701,462

(22) Filed: Apr. 30, 2015

(51) Int. Cl.
  *G06F 15/16* (2006.01)
  *G06F 16/182* (2019.01)
  (Continued)

(52) U.S. Cl.
  CPC ........ *G06F 16/183* (2019.01); *G06F 16/1827* (2019.01); *H04L 67/1097* (2013.01); *H04L 67/2842* (2013.01); *H04L 67/42* (2013.01)

(58) Field of Classification Search
  CPC ........ G06F 17/30194; G06F 17/30159; G06F 17/30203; G06F 3/067; G06F 3/061; G06F 3/0611; G06F 11/1464; G06F 12/0868; G06F 13/18; G06F 17/30123; G06F 2206/1012; G06F 2212/314; G06F 3/0614; G06F 3/0631; G06F 3/0635; G06F 3/064; G06F 21/6218; H04L 67/1097; H04L 47/70; H04L 67/1002; H04L 67/1004; H04L 67/1006; H04L 67/18; H04L 67/2842; H04L 29/06; H04L 67/14; H04L 29/06319; H04L 29/08252; H04L 29/08576; H04L 69/329; H04L 63/166; H04L 67/1008; H04L 67/1027; H04L 67/06
  See application file for complete search history.

(56) References Cited

U.S. PATENT DOCUMENTS 6,654,772 B1  11/2003  Crow et al.
6,842,754 B2  1/2005  Muntz
(Continued)

FOREIGN PATENT DOCUMENTS

WO  1999038095  7/1999

OTHER PUBLICATIONS

USENIX, "A Directory Index for Ext2", Daniel Phillips, Sep. 19, 2001, pp. 1-13.
(Continued)

*Primary Examiner* — Sm A Rahman
*Assistant Examiner* — Ranjan Pant
(74) *Attorney, Agent, or Firm* — Robert C. Kowert; Meyertons, Hood, Kivlin, Kowert & Goetzel, P.C.

(57) ABSTRACT

An access node of a distributed service collects workload data pertaining to at least one peer group of access nodes established for handling client requests. During a particular load shedding analysis, the access node uses the collected metrics to detect that a triggering condition for load shedding with respect to a set of persistent client connections has been met. Each persistent client connection is set up to be usable for a plurality of client requests. The access node initiates a phased termination of at least one selected persistent client connection. The phased termination comprises allowing completion of in-flight requests on the connection and rejecting new requests on the connection.

22 Claims, 12 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 6,961,341 B1 | 11/2005 | Krishnan | |
| 7,043,637 B2 | 5/2006 | Bolosky et al. | |
| 7,240,114 B2 | 7/2007 | Karamanolis et al. | |
| 7,895,352 B2 | 2/2011 | Ageyev et al. | |
| 8,112,395 B2 | 2/2012 | Patel et al. | |
| 8,112,452 B2 | 2/2012 | Adya et al. | |
| 8,205,090 B2 | 6/2012 | Oom Temudo de Castro et al. | |
| 8,229,985 B2 | 7/2012 | Turner et al. | |
| 8,275,902 B2 | 9/2012 | Philip et al. | |
| 8,285,689 B2 | 10/2012 | Du et al. | |
| 8,356,162 B2 | 1/2013 | Muff et al. | |
| 8,429,248 B1 | 4/2013 | Ketrenos et al. | |
| 8,489,658 B2 | 7/2013 | Turner et al. | |
| 8,539,008 B2 | 9/2013 | Faith et al. | |
| 9,432,305 B1* | 8/2016 | Das | H04L 61/1511 |
| 9,678,995 B2* | 6/2017 | Michael | G06F 12/0815 |
| 2002/0069369 A1* | 6/2002 | Tremain | H04L 63/0209 726/14 |
| 2002/0138559 A1 | 9/2002 | Ulrich et al. | |
| 2004/0088386 A1* | 5/2004 | Aggarwal | G06F 11/3495 709/220 |
| 2004/0181605 A1 | 9/2004 | Nakatani et al. | |
| 2004/0268357 A1* | 12/2004 | Joy | H04L 29/06 718/105 |
| 2008/0091812 A1* | 4/2008 | Lev-Ran | H04L 29/12169 709/223 |
| 2008/0163237 A1* | 7/2008 | Ito | G06F 16/284 718/104 |
| 2008/0208959 A1* | 8/2008 | St. John | H04L 67/02 709/203 |
| 2009/0240705 A1 | 9/2009 | Miloushev et al. | |
| 2010/0036903 A1 | 2/2010 | Ahmad et al. | |
| 2010/0262650 A1* | 10/2010 | Chauhan | H04L 67/26 709/203 |
| 2011/0055368 A1* | 3/2011 | Colrain | G06F 9/505 709/223 |
| 2011/0208875 A1* | 8/2011 | Hasson | G06F 1/3203 709/238 |
| 2011/0307534 A1 | 12/2011 | Peng et al. | |
| 2012/0066363 A1* | 3/2012 | Somogyi | H04L 41/042 709/223 |
| 2012/0246637 A1* | 9/2012 | Kreeger | H04L 67/1038 718/1 |
| 2013/0239119 A1* | 9/2013 | Garg | G06F 9/5083 718/105 |
| 2013/0339407 A1* | 12/2013 | Sharpe | G06F 3/0611 707/827 |
| 2014/0006354 A1* | 1/2014 | Parkison | G06F 3/0611 707/649 |
| 2014/0006465 A1* | 1/2014 | Davis | G06F 16/182 707/827 |
| 2014/0007239 A1* | 1/2014 | Sharpe | G06F 21/561 726/24 |

OTHER PUBLICATIONS

"HyperDex: A Distributed, Searchable Key-Value Store" Robert Escriva et al., Aug. 13-17, 2012, pp. 1-12.
"Paxos Made Simple", Leslie Lamport, Nov. 1, 2001, pp. 1-14.
2012 Storage Networking Industry Association, "An Overview of NFSv4: NFSv4.0, NFSv4/1, pNFS, and proposed NFSv4.2 features" Jun. 2012, pp. 1-14.
Amazon Web Services "Amazon Virtual Private Cloud, User Guide, API Version" Feb. 1, 2014, pp. 1-155.
"Advanced Load Balancing: 8 Must-Have Features for Today's Network Demands" Citrix Systems, Inc. NetScaler white paper, Sep. 2009, pp. 1-9.
"Citrix Netscaler Load Balancing Algorithms" University of Wisconsin KnowledgeBase, Downloaded from kb.wisc.edu/ns/page.php?id=13201 on Apr. 14, 2013, pp. 1-5.
"Is your load balancer cloud ready? How NetScaler helps enterprises achieve cloud computing benefits" Citrix Systems, Inc. NetScaler white paper, Apr. 2010, pp. 1-9.
"Intel® Data Plane Development Kit (Intel® DPDK) Getting Started Guide", Nov. 2012, pp. 1-18.
"Intel® Data Plane Development Kit (Intel® DPDK) Programmer's Guide", Nov. 2012, pp. 1-90.
Intel® Data Plane Development Kit (Intel® DPDK) Sample Application User's Guide Nov. 2012, pp. 1-75.
U.S. Appl. No. 14/701,464, filed Apr. 30, 2015, Tarang Gupta.
U.S. Appl. No. 13/799,386, filed Mar. 13, 2013, Swaminathan Sivasubramanian, et al.
U.S. Appl. No. 13/800,796, filed Mar. 13, 2013, Kiran-Kumar Muniswamy-Reddy, et al.
U.S. Appl. No. 13/926,686, filed Jun. 25, 2013, Wei Xiao, et al.
U.S. Appl. No. 13/926,697, filed Jun. 25, 2013, Wei Xiao, et al.
U.S. Appl. No. 13/926,694, filed Jun. 25, 2013, Stuart Henry Seelye Marshall, et al.
U.S. Appl. No. 13/926,708, filed Jun. 25, 2013, Wei Xiao, et al.
U.S. Appl. No. 13/926,684, filed Jun. 25, 2013, Wei Xiao, et al.
U.S. Appl. No. 14/231,116, filed Mar. 31, 2014, Matti Juhani Oikarinen, et al.
U.S. Appl. No. 14/231,106, filed Mar. 21, 2014 Matti Juhani Oikarinen, et al.
U.S. Appl. No. 14/231,098, filed Mar. 31, 2014, Pradeep Vincent, et al.
U.S. Appl. No. 14/231,095, filed Mar. 31, 2014, Joshua Samuel Hendrickson, et al.
U.S. Appl. No. 14/231,088, filed Mar. 31, 2014, Pradeep Vincent, et al.
U.S. Appl. No. 14/230,378, filed Mar. 31, 2014, Jacob A. Strauss, et al.
U.S. Appl. No. 14/231,077, filed Mar. 31, 2014, Jacob A. Strauss, et al.
U.S. Appl. No. 14/231,070, filed Mar. 31, 2014, Matti Juhani Oikarinen, et al.
U.S. Appl. No. 14/231,063, filed Mar. 31, 2014, Matti Juhani Oikarinen, et al.
U.S. Appl. No. 14/231,057, filed Mar. 31, 2014, Pradeep Vincent.
U.S. Appl. No. 14/231,047, filed Mar. 31, 2014 Pradeep Vincent, et al.

\* cited by examiner

LOAD SHEDDING TECHNIQUES FOR DISTRIBUTED SERVICES WITH PERSISTENT CLIENT CONNECTIONS TO ENSURE QUALITY OF SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Some large provider networks implement a variety of storage services, such as services that implement block-level devices (volumes) or objects that can be modeled as arbitrary bit buckets accessible via respective URLs. However, a number of applications running at data centers of a provider network may still face limitations with respect to their use of some of the more common storage-related programmatic interfaces, such as various industry-standard file system interfaces. Some industry-standard file systems may have been designed prior to the large-scale deployment of network-accessible services, and may therefore support consistency models and other semantics that are not straightforward to implement in distributed systems in which asynchronous computational interactions, failures of individual components and network partitions or networking-related delays are all relatively common.

Distributed implementations of file systems and at least some other services may also have to deal with more complex workload balancing problems than, for example, have to be handled with respect to web-services applications relying on stateless protocols such as HTTP. Connections established from client devices to the components of such services may sometimes persist for long durations, with each connection being used for many different requests and responses. The rates at which requests are received via such a persistent connection, and the amount of data typically transmitted per request, may vary substantially over time. Especially in provider network environments handling tens of thousands of concurrent users, managing diverse and time-varying requirements for persistent connections may present a non-trivial challenge.

Figure 1:
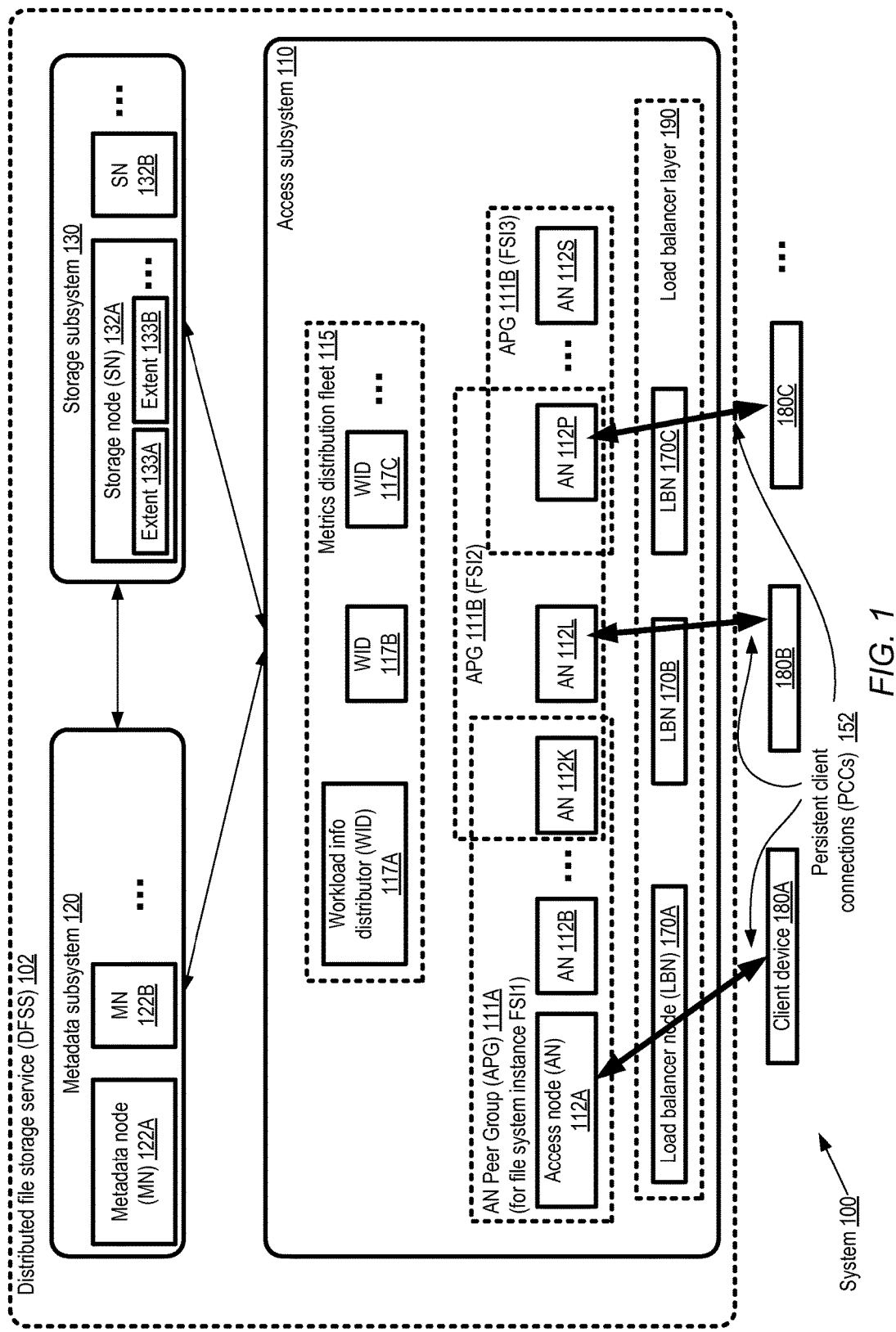
FIG. 1 illustrates an overview of a system in which a distributed file storage service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing load shedding at an access subsystem of a large-scale distributed file storage service (DFSS) and/or other similar distributed services are described. In at least some embodiments, the DFSS may be designed to support shared access to files by thousands of clients, where each individual file may comprise very large amounts (e.g., petabytes) of data, at performance, availability and durability levels that are targeted to be independent of the size of the file and/or the number of concurrent users. One or more industry-standard file system interfaces or protocols may be supported by the DFSS, such as various versions of NFS (network file system), SMB (Server Message Block), CIFS (Common Internet File System) and the like. The DFSS may be intended for use by a wide variety of applications, such as file content serving (e.g. web server farms, software development environments, and content management systems), high performance computing (HPC) and "Big Data" applications such as media, financial, and scientific solutions requiring on-demand scaling of file store capacity and performance. In at least some implementations, the DFSS may be engineered so as to enable clients to collectively create hundreds of thousands of file system instances (FSIs) (e.g., using the logical equivalent of a respective "mkfs" system call for each file system instance, followed by the logical equivalent of a "mount" call for a root directory of the file system instance).

To help enable high levels of scalability, a modular architecture may be used for the DFSS in at least some embodiments. For example, a physical storage subsystem comprising some number of multi-tenant storage nodes may be used for file store contents, while a logically distinct metadata subsystem with its own set of metadata nodes may be used for managing the file store contents in one implementation. The logical separation of metadata and data may be motivated, for example, by the fact that the performance, durability and/or availability requirements for metadata may in at least some cases differ from (e.g., be more stringent than) the corresponding requirements for data. A front-end access subsystem, with its own set of access nodes distinct from the metadata and storage nodes, may be responsible for exposing network endpoints that allow clients to submit requests to create, read, update, modify and delete the file stores (and objects within the file stores) via the industry-standard interfaces and/or custom interfaces. The access subsystem may be responsible for handling connection management, admission control and other load-balancing-related operations, authentication, authorization as well as other tasks associated with client interactions. Resources may be deployed independently to any one of the subsystems in some embodiments, e.g., to the access subsystem, the metadata subsystem, or the storage subsystem, without requiring corresponding deployment changes at the other subsystems. For example, if a triggering condition such as a potential performance bottleneck is identified in the access subsystem, or if some set of access nodes experience a network outage or other failure, additional access nodes may be brought online without affecting the storage or metadata subsystems, and without pausing the flow of client requests. Similar deployment changes may be made at other subsystems as well in response to various types of triggering conditions. In at least some embodiments, the contents of the file store metadata objects (e.g., data structures representing attributes of directory entries, links, etc.) may themselves be stored on devices managed by the storage subsystem. The term "file store object" may be used herein to refer collectively to data objects such as files, directories and the like that are typically visible to clients of the DFSS, as well as to the internal metadata structures (including for example mappings between logical blocks, physical pages and extents) used to manage and store the data objects.

In at least some embodiments, the DFSS may be built using resources of a provider network, and may be designed at least in part to fulfill storage requests received from various other entities within the provider network. Networks set up by an entity such as a company or a public sector organization to provide one or more network-accessible services (such as various types of cloud-based computing or storage services) accessible via the Internet and/or other networks to a distributed set of clients may be termed provider networks herein. Provider networks may sometimes be referred to as "public cloud" environments. Some of the provider network services may be used to build higher-level services, or for administrative purposes by other services: for example, a virtual computing service or a database service may be used as building blocks for some of the components of the DFSS in at least some embodiments. In one embodiment, the file storage service may be accessible from some subset (or all) of the computing platforms (e.g., the guest virtual machines and virtualization hosts) of a virtual computing service of the provider network, e.g., as a result of assigning the appropriate network addresses to the access nodes of the storage service, implementing the authorization/authentication protocols that are used for the virtual computing service, and so on. In some embodiments, clients outside the provider network may also be provided access to the DFSS.

In various embodiments, at least some of the provider network services may implement a usage-based pricing policy—e.g., customers may be charged for a virtual machine based at least partly on how long the instance was used, or on the number of requests of various types that were submitted from the virtual machine. In at least some such embodiments, the DFSS may also employ usage-based pricing for at least some categories of client requests—e.g., the service may keep records of the total size of a given file system instance (which corresponds to the storage space used), and/or the total number of bytes read or written to the file system instance, and may generate billing amounts for the customer on the basis of such records. In some cases a "provisioned performance" based billing model may be used, in which a customer indicates a desired level of performance for a file system instance (e.g., expressed as an aggregate throughput in megabytes/second, or in requests/second), the DFSS pre-allocates or provisions resources (such as access nodes, metadata nodes and/or storage nodes) based on the target performance level, and the customer billing amounts are based on the target performance. The DFSS may support high levels of data durability in some embodiments, e.g., using any of a number of different replication techniques, which may impact the total storage used. For example, in one embodiment, file store data and metadata may be physically stored using storage units called extents, and the contents of an extent may be replicated at various physical storage devices. A given modification request from a client may accordingly be translated into a plurality of physical modifications at respective storage devices and/or respective storage subsystem nodes, depending on the nature of the replication policy in use for the corresponding file store object or metadata.

In various embodiments, in order to access a particular file system instance, a persistent connection may be established between a client device (e.g., a computing device at which one or more applications of a customer are executed) and an access node of the DFSS. In embodiments in which a variant of the NFS protocol is supported, for example, such a persistent connection may be established to the DFSS from a kernel-mode NFS client component on a client device. In at least some embodiments as described below, a load balancer (which may comprise a dedicated hardware device, or may be implemented in software) may be used for the persistent connection—e.g., the kernel-level client may send a connection request to a load balancer set up for a file system instance, and the load balancer may select an access node and establish connectivity to the access node on behalf of the client. In such scenarios, a logical persistent connection between the client and the DFSS may include the use of two lower-level connections—one between the kernel-level client and a load balancer, and one between the load balancer and the access node selected by the load balancer. Multiple requests directed at the file system instance may be initially generated at an application process at the client device, passed from the application process to the kernel-mode client component, and transmitted using the same logical persistent connection to an access node of the DFSS.

Depending on the nature of the client's request, one or more corresponding internal requests may be transmitted by the access node to one or more back-end nodes (e.g., metadata nodes or storage nodes) of the DFSS. Responses may be generated at the back-end node(s) and/or the access nodes, and provided to the client using the reverse of the path used for the requests. In at least some embodiments, several different access nodes may be designated as members of an access node peer group (APG) for a given file system instance, and a given sequence of client requests may be directed via a hardware or software load balancer to one of the APG members using a persistent connection. In various embodiments, a given connection between a client device and an access node may be expected to remain in operation for a potentially long period of time (e.g., hours) and be used for multiple request-response pairs. Such connections between the clients and the access nodes may be termed persistent client connections (PCCs) herein. In at least some embodiments, the access nodes may typically be responsible for continuing to service requests received on a given PCC until either (a) the PCC is closed at the initiative of the client (i.e., either the kernel-mode client component, or the application-layer client) or (b) the access node selects the PCC as a load shedding target as described below.

The rate at which requests (and corresponding responses) flow over a given PCC may change over time. Accordingly, the throughput (bytes transferred over the PCC, primarily for client-requested reads and/or writes) of a given PCC may also vary over time. In at least some embodiments, the DFSS may implement various algorithms to ensure that the quality of service experienced by various clients scales as the overall workload level increases or fluctuates, and as the request rate of individual PCCs varies. In some embodiments, the DFSS may attempt to guarantee (or at least make a best effort to provide) a total throughput for a given file system instance (FSI) based on a provisioned throughput level for the FSI, and/or based on the size of the FSI (e.g., as a baseline, X megabytes/second of aggregated read and write throughput may be provided for each terabyte of data stored at the file system instance). However, a given FSI may have many different PCCs active at a given time (e.g., corresponding to respective client-side application threads, potentially running at numerous client devices). The requested throughput of one PCC (say, PCC-j) during a given time interval may differ substantially from the requested throughput of another PCC (PCC-k), and may also differ substantially from its PCC-j's own requested throughput during a different time interval. Furthermore, during some time periods, the request rate (or total bytes requested) may spike to a much higher value than the overall average for a given PCC, while remaining well below the average for a different PCC, and the DFSS may need to accommodate such bursty behavior. The problems of throughput management on a file system instance level may be further compounded by the facts that (a) each access node may be responsible for requests associated with many different FSIs, and (b) any given FSI may be accessed from geographically distributed locations (e.g., via access nodes that may be located in a variety of data centers distributed around the world).

In view of the persistent nature of PCCs, the variations in the PCC workloads, and the multi-tenant design of the DFSS, access nodes may implement or participate in a number of workload management mechanisms in various embodiments. According to one such mechanism, in some embodiments a given access node (e.g., AN-k) of the DFSS may implement a sequence of load shedding analysis iterations (LSAIs). In a given load shedding analysis, AN-k may first determine whether a local workload level (e.g., based on an aggregate throughput metric associated with AN-k's PCCs, a total number of active PCCs, a worker thread pool utilization metric, and/or various other local workload indicators as described below) meets a triggering condition for initiating load shedding. If the triggering condition is met, in various embodiments AN-k may attempt to identify one or more victim or "kill target" PCCs for which a phased termination or closure procedure should be implemented. In some embodiments, as described in further detail below with respect to FIG. 8, instead of or in addition to using absolute values of local metrics to trigger the initiation of load shedding, AN-k may initiate load shedding if it detects an imbalance between the workload levels of different access nodes—e.g., if AN-k determines that AN-k's own workload level with respect to a given FSI exceeds the average workload level of the set of peer ANs responsible for that FSI. When considering whether a particular PCC (e.g., PCC-j) affiliated with a particular FSI (e.g., FSI-a) should be designated as a potential victim, and/or when detecting workload imbalances among peer ANs, AN-k may use a peer workload metric cache containing reports of the workload levels at other access nodes which may also be responsible for handling client requests for FSI-a (and/or other FSIs). In at least some embodiments, a fleet of workflow information distributor (WIDs) nodes may be established for the access subsystem of the DFSS, responsible for acquiring and disseminating local workload metrics of the various ANs, e.g., using periodic "heartbeat" messages. Such messages received from one or more WIDs may be used to populate and update the peer workload metric caches at the access nodes.

If AN-k determines, using its local cache of peer access nodes' workload metrics, that an available-capacity criteria is met by the peer access nodes, PCC-j may be designated as a victim in various embodiments, and a graceful phased closure procedure may be initiated for PCC-j. For example, PCC-j may be placed in a quiescent state, new client requests of one or more categories received via PCC-j may be rejected, and ongoing requests (such as various types of "compound" NFS requests in some implementations) may be allowed to complete, before PCC-j is closed in accordance with the networking protocol (e.g., TCP/IP or Transmission Control Protocol/Internet Protocol) being used. The closing of PCC-j may lead the kernel-level client component to request an establishment of a replacement PCC with the DFSS as described below in further detail. Thus, before deciding to close a particular PCC PCC-j in a situation in which AN-k determines that it (AN-k) is sufficiently overloaded to warrant terminating connections ("shedding" its load), AN-k may first try to estimate whether peer ANs collectively responsible for handling FSI-a requests are likely to have enough spare resources to be able to handle PCC-j's traffic. If AN-k has insufficient information about the peer group with respect to FSI-a (e.g., if AN-k's cache of peer workload information is stale or does not contain enough entries to enable an estimate of the peer group's capacity to be made), AN-k may examine whether a different PCC (e.g., PCC-m, established for a different FSI (FSI-b) should be considered for termination, based on cached information about FSI-b's AN peer group, for example, and so on. In various embodiments, the search for victim PCCs may continue during the load shedding analysis iteration (LSAI) until either (a) a sufficient number of PCCs have been selected as victims, or (b) no more PCCs remain to be considered as potential victims. After a given LSAI is completed, the next LSAI may be scheduled, e.g., after an interval whose exact duration may be computed using a baseline value and a randomized jitter factor.

It is noted that at least in some embodiments, when it determines that PCC-j should be closed, AN-k may have no real control on the selection of the particular peer AN at which a replacement PCC is established. For example, as mentioned above, a load balancer may be responsible for selecting the new AN to be used for the traffic which would have been handled using PCC-j if PCC-j had not been closed. Instead, the above algorithm used for load shedding described above relies on a probabilistic approach—AN-k makes a judgement about how likely it is that other members of the AN peer group associated with the FSI of the kill target can handle the future workload of the kill target, and terminates the kill target PCC on the assumption that one of the other peer ANs is likely to be selected for the replacement connection. As described below in the context of FIG. 4h, it may sometimes be the case that the same AN (AN-k in the above example) is selected for the replacement PCC as was being used for the killed PCC. In one implementation, AN-k may be configured to provide hints or recommendations to a load balancer (and/or to the client) regarding which particular peer ANs should be selected for the replacement PCC.

Although the majority of the examples and illustrations provided herein are directed to a distributed file storage service at which client requests are handled using persistent connections, it is noted that the kinds of load shedding techniques described herein may be applied with equal success in any distributed system at which similar persistent connections are established. For example, similar load shedding techniques may be applied at distributed database services, storage services that do not necessarily implement file system interfaces, machine learning services, and so on. Furthermore, a distributed service may not necessarily be architected in the modular manner discussed above in order to benefit from the load shedding techniques. Thus, a logical split among an access subsystem, a metadata subsystem and a storage subsystem is not a requirement. If multiple nodes of the distributed service are responsible for handling respective sets of distinct client requests, and as a result workload imbalances may arise among the different nodes, the load shedding techniques described herein may prove beneficial in various embodiments.

Example System Environment

FIG. 1 illustrates an overview of a system in which a distributed file storage service may be implemented, according to at least some embodiments. As shown, system 100 includes several subsystems of a modular distributed file storage service (DFSS) 102, including an access subsystem 110, a metadata subsystem 120, and a storage subsystem 130. The access subsystem 110 may include a plurality of access nodes (ANs) 112, configured as endpoints with which clients of the DFSS may interact to submit requests for various types of file system operations. Access nodes may also be referred to as "hubs" in some environments. In the depicted embodiment, any given AN may be configured to receive client requests directed at one or more file system instances (FSIs), and a plurality of ANs may form an AN peer group (APG) 111 collectively responsible for processing client requests directed at a given FSI. For example, APG 111A comprising ANs 112A, 112B and 112K may have been established for a file system instance FSI1. Similarly, APG 111B comprising ANs 112K, 112L and 112P is set up for a file system instance FSI2, while a third APG 111C comprising ANs 112P and 112S may be responsible for handling requests directed at a third file system instance FSI3.

The DFSS may implement any of a number of different file system protocols or standards in various embodiments, such as variants of NFS, CIFS and/or SMB. For at least some such protocols, persistent client connections (PCCs) 152 may be established between client computing devices 180 (e.g., 180A, 180B or 180C) and one or more ANs 112 via a load balancer layer 190 in some embodiments. A load balancer node 170 (e.g., 170A, 170B or 170C) used for a given FSI may be assigned a particular network address (e.g., a virtual IP (Internet Protocol) address), and the clients may send their requests corresponding to the given FSI to the address of that load balancer. The load balancer node 170 may then forward the request along a particular PCC 152 to a selected AN 112 of an APG 111 associated with the given FSI. A given PCC may thus encompass at least two lower-level connections: one between a client device and a load balancer node, and one between the load balancer node and an AN. The terms "load balancer" and "load balancer node" may be used interchangeably herein. In at least some embodiments, different networking protocols and/or encapsulation protocols may be used for the respective lower level connections. In some embodiments, a separate load balancer layer may not necessarily be used.

In response to receiving a client request via a PCC 152, an AN 112 may determine which (if any) back-end components (e.g., metadata nodes 122 and/or storage nodes 132) are to participate in the fulfillment of the request. For some types of requests, the AN 112 may be able to respond to the client's request without interactions with the back-end storage or metadata subsystems in at least some embodiments—e.g., some ANs may maintain local caches of file system metadata and/or data which can be used for the client requests. For other types of requests, the AN may transmit internal requests to one or more metadata nodes (MNs) 122 and/or one or more storage nodes (SNs) 132. In at least some embodiments, the data and/or of the DFSS may be stored in replicated units called extents, such as extents 133A and 133B. In order to identify exactly which extents are to be read or written to respond to a given client request, various types of metadata such as block maps or page maps may have to be consulted with the help of selected metadata nodes 122, and the appropriate storage nodes 132 to which internal requests should be directed may thereby be identified. Internal responses received from the metadata subsystem 120 and/or the storage subsystem 130 may be used to generate the responses provided to the clients from the AN via the PCCs 152.

Based on their service level agreements, customers of the DFSS may typically expect the performance of their file systems to scale as the file systems grow larger and/or as the request rate changes. Furthermore, the rate at which data is read and/or written via a given PCC may vary dramatically over time, and the number of PCCs associated with a given FSI may change over time as well (e.g., as new connections are established from additional client devices 180). Other factors such as geographical dispersion of the set of nodes (ANs, MNs and SNs) responsible for a given may also complicate the resource allocation task of the DFSS in various embodiments—e.g., some requests to a given FSI may be received at one data center, while other requests may have to be handled at a second data center.

In order to provide the desired service levels, one or more workload management mechanisms including a distributed load shedding technique may be implemented in the depicted embodiment. In the load shedding technique, each of the ANs 112 may collect local workload metrics of various kinds, and provide periodic updates indicative of the metrics to one or more workload information distributors (WIDs) 117 of a metrics distribution fleet 115. Each WID may periodically disseminate workload information collected individually from some source set of ANs (e.g., all the ANs of one or more APGs 111) to all the ANs of a destination set in the depicted embodiment. Thus, for example, WID 117A may aggregate workload information obtained individually from ANs 112A, 112B and 112K, and then send each of those ANs a summarized representation of the raw information (or, in some cases, the raw information itself) of the whole group. In some embodiments, the workload information (to and/or from the WIDs 117) may be piggybacked onto (i.e., included as part of) heartbeat messages which are exchanged between the ANs and the WIDs. The heartbeat messages may be used at least in part for purposes other than load shedding, e.g., to support health state tracking of the ANs, in various embodiments. At a given AN 112, the workload information regarding other ANs may be stored in a cache, which may be periodically updated based on the contents of the messages received from the WIDs 117. Due to the asynchronous nature of the updates, the possibility of dropped or delayed network packets, and/or other factors, any given AN may not necessarily always have the most current workload information about at least some of its peer ANs. It is noted that in some embodiments, instead of communicating via the WIDs 117, ANs may transmit workload information directly to one another; that is, WIDs may not be required. In at least some embodiments, WIDs 117 may communicate with one another as well—e.g., in a multi-data center environment, a WID located in one data center may transfer its summarized metrics to another WID in a second data center for local distribution among the ANs in the second data center.

Using its local workload metrics and/or the peer group workload metrics, each AN 112 in the depicted embodiment may implement a sequence of load shedding analysis iterations (LSAIs). In a given LSAI, in one embodiment an AN may first determine whether triggering criteria for initiating load shedding have been met locally. For example, if a metric of local worker thread pool utilization (derived from some number of recent snapshots of the number of idle versus busy threads) exceeds a threshold, an aggregate throughput metric for all the local PCCs at the AN exceeds a threshold, and/or a total number of active PCCs exceeds a threshold, a search for one or more victim PCCs to be closed or "shed" may be initiated in various embodiments. In various embodiments time-decay functions or other transformations may be applied to a recent set of local workload metrics, e.g., to reduce the impact of short-term fluctuations, and the results of such transformations may be used to decide whether the search for victims should be begun. In a variant of the technique (discussed in greater detail below with respect to FIG. 8), instead of using local metrics alone to trigger the termination of one or more PCCs, the AN may decide to close one or more PCCs if it detects an imbalance between the workloads of different ANs.

The order in which various PCCs are examined for possible termination may differ from one embodiment to another. In one embodiment, for example, the AN implementing the LSAI may sort PCCs based on their per-PCC throughput metrics, for example, and examine the PCCs in decreasing or increasing order of throughput. In another embodiment the PCCs may be considered in random order.

To determine whether a particular PCC (e.g., PCC-j) established for a file system instance FSI-a is to be selected as a victim, the AN may examine the information it has regarding other ANs of the APG 111 responsible for requests directed at FSI-a. If, based on the peer group information obtained from the metric distribution fleet, the AN determines that the available capacity of the APG as whole exceeds a threshold level, PCC-j may be designated as a victim in the depicted embodiment; otherwise, the AN may examine other PCC candidates (if any PCCs remain to be examined).

A phased termination procedure may be initiated for a victim PCC-j in at least some embodiments. In one such procedure, the victim PCC-j may be placed in a quiescent state, and subsequent incoming requests of one or more types may be rejected. Long-lasting requests (similar to the compound remote procedure calls supported in NFS version 4) which began before the PCC was placed in the quiescent state may be allowed to complete in some embodiments. In at least one embodiment, a timeout period may be started when the victim PCC is quiesced, and a request to explicitly close the PCC may be sent either when the timeout expires or when the last remaining in-progress request has been fulfilled, whichever occurs earlier. The format of the connection close request may differ depending in the particular networking protocol being used in various embodiments. In at least some embodiments, an AN may attempt to initiate the termination of more than one PCC during a given LSAI—e.g., enough victims may be terminated until the number of active PCCs falls below a threshold. After a given LSAI is completed (e.g., after the phased termination of a sufficient number of PCCs has been initiated, or after all the PCCs have been considered), the next LSAI may eventually be scheduled. A configurable parameter may be used to determine the inter-LSAI duration in some embodiments. The inter-LSAI duration may not exactly be the same for all pairs of LSAIs in some embodiments—e.g., an element of randomness may be introduced into LSAI scheduling to avoid problems that may arise due to lock-stepped LSAIs.

When the client (e.g., a kernel-mode client component on the client device 180) for which a PCC was established detects that a PCC has been closed, it may issue a request to a load balancer node 170 to establish a replacement PCC in the depicted embodiment. Upon receiving the request, the load balancer node may select a particular AN of the peer group as the endpoint for the replacement PCC, and establish connectivity to the particular AN. Subsequent requests and responses from the client may then flow via the replacement PCC. It is noted that depending on the manner in which load balancing is being implemented, it may sometimes be the case that the same AN which terminated a victim PCC may be chosen for the replacement PCC, although under normal operating conditions this may not happen very frequently. In general, the AN which selected and closed a victim PCC may not have direct control over which particular AN is used for the corresponding replacement PCC in the depicted embodiment. In at least one embodiment, an AN which is in the process of executing an LSAI may reject new connection requests. In some embodiments, the load shedding algorithm described herein may be used in conjunction with other workload management techniques such as throughput throttling, in which an AN may distribute a maximum throughput among the PCCs it handles based on various throttling parameters which are updated periodically by the WIDs or by other components of the system 100.

As long as the resources of an APG configured to handle requests for a given FSI are sufficient to collectively handle the client workload directed to the FSI, the technique outlined above may generally be able to distributed workloads such that no single AN of an APG remains highly overloaded for very long. Furthermore, very little overhead and/or inter-AN synchronization may typically be required, especially if the workload information transferred between the ANs is piggybacked on heartbeats or other messages. As mentioned earlier, in various embodiments, similar load shedding techniques may be employed with equal success at distributed services which do not necessarily implement file systems. Access nodes may be aggregated into AN peer groups (APGs) based on a number of different criteria in various types of distributed systems at which the load shedding techniques are applied. For example, client requests may be placed in different categories based on the set of client devices at which they originate, or based on the target back-end servers at which the requests are to be processed, and respective APGs may be set up for each category of client requests. At a distributed database service, for example, one APG may be set up for handling requests directed to one database instance (which may be considered a first category of requests), and another APG may be set up for handling requests directed to another database instance (a different category of requests).

Interactions Between Access Nodes and Workload Information Distributors

Figure 2:
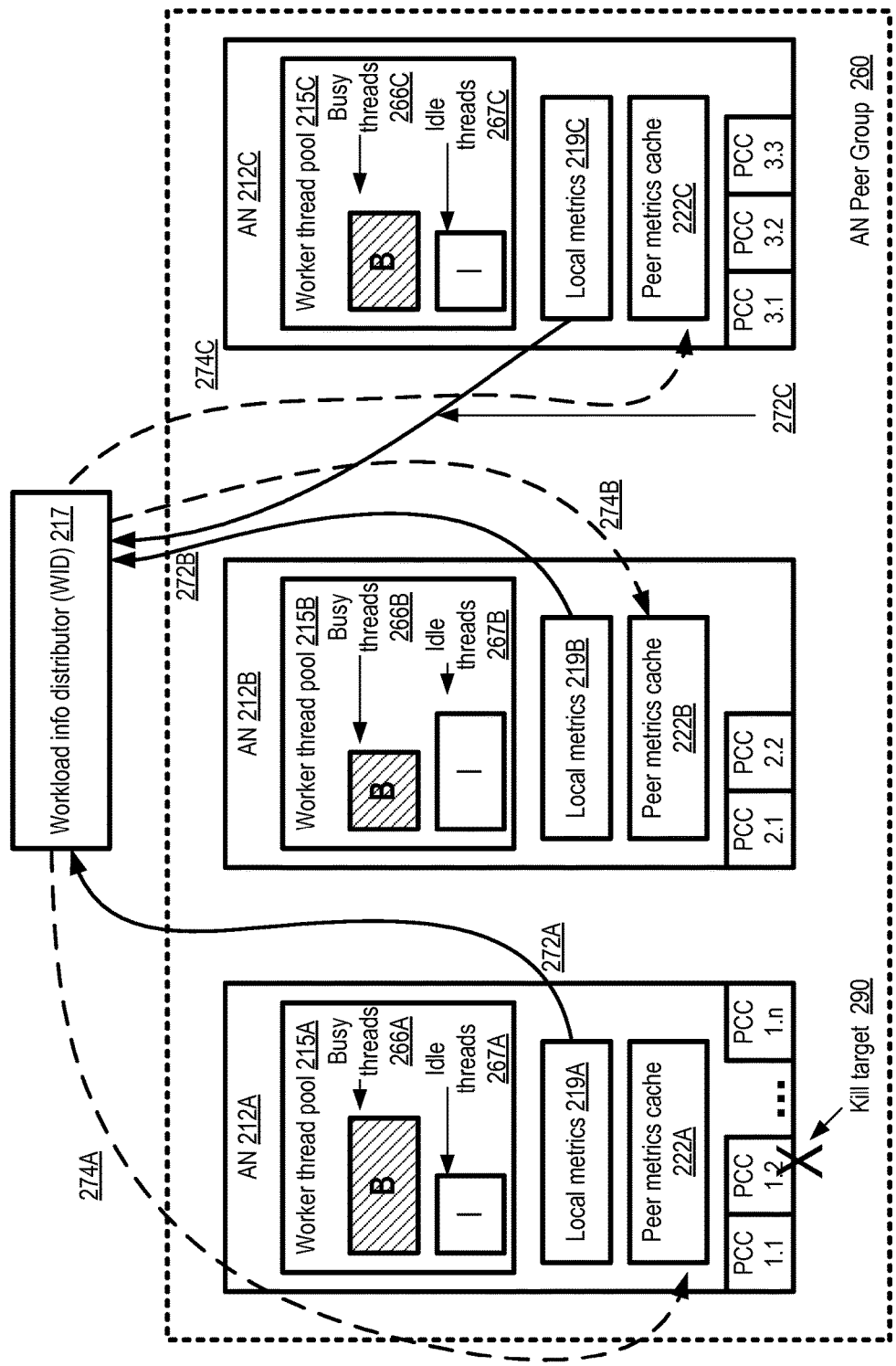
FIG. 2 illustrates examples of the exchange of load shedding-related messages between access nodes and workload information distributor nodes of a distributed file storage service, according to at least some embodiments.

FIG. 2 illustrates examples of the exchange of load shedding-related messages between access nodes and workload information distributor nodes of a distributed file storage service, according to at least some embodiments. As shown, each AN 212 of AN peer group 260, such as 212A, 212B or 212C, may have a number of PCCs established. AN 212A has PCC 1.1 through 1.n, for example, while AN 212B has PCC 2.1 and PCC 2.2, and PCCs 3.1-3.3 have been established at AN 212C. Each AN 212 may comprise a respective worker thread pool 215 in the depicted embodiment, such as pools 215A-215C at ANs 212A-212C respectively. Each thread pool 215 may include some number of threads of execution (or processes) which may be assigned to process client requests received via the PCCs. In some embodiments, for example, a particular worker thread may be selected for an incoming request, and may perform the access node operations required to prepare the response— e.g., identifying the metadata node or storage node to which a corresponding internal request is to be sent, preparing the internal request, transmitting the internal request and in some cases waiting for the response from the metadata or storage subsystem. Thus, the number of busy worker threads 266 (e.g., 266A, 266B or 266C) of an AN at any given point of time may be considered a reasonably representative measure of the workload (generally indicative both of the number of client requests being handled at the AN concurrently, and the duration or complexity of the requests). The ratio of the busy thread count to the total thread count of the pool may be designated the utilization of the pool in the depicted embodiment.

In at least some embodiments, snapshots of the worker thread pool utilization may be obtained periodically (e.g., once every N milliseconds or seconds) at each AN and added to a local metrics collection 219. In various embodiments, some number of the snapshots may be aggregated (e.g., using a time-decay function which grants higher weights to more recent snapshots) for inclusion in the local metrics messages 272 sent from the ANs 212 to the WID 217. In other embodiments, the raw worker thread pool data may be sent to the WIDs, and aggregation or transformation functions may be applied at the WID. AN 212A's thread pool utilization metrics may be included in messages 272A, AN 212B's thread pool utilization metrics may be included in messages 272B, and AN 212C's thread pool utilization metrics may be included in messages 272C. The WID in turn may provide a combined or consolidated view of the metrics of all the ANs in the messages 274 it sends in the reverse direction—e.g., messages 274A to AN 212A, messages 274B to AN 212B, and messages 274C to AN 212C. In one embodiment, a message 274 sent from the WID to a particular AN (e.g., AN 212A) may only include metrics of the other ANs (e.g., ANs 212B and 212C) of the peer group, since the destination AN for the message 274 may already have its own metrics. In at least some embodiments, other local metrics 219 (such as aggregated or per-PCC throughput measures, the counts of active PCCs, and so on) may be included in AN-to-WID messages 272, and consolidated versions of at least some of those metrics may be provided in WID-to-AN messages 274. Transformations such as time-decay functions may be applied to these metrics as well, either at the ANs or at the WIDs. The contents of the peer metrics caches 212 may be refreshed or updated based on the messages 274 received from the WIDs in the depicted embodiment. The local metrics 219 may be used by each AN during its LSAIs to determine whether the AN is sufficiently overloaded to initiate load shedding, and/or to determine when to terminate an LSAI (e.g., after enough victim PCCs have been found to reduce the number of active PCCs below a threshold). The peer metrics caches 222 may be used to identify particular victim PCCs for termination, and/or to determine whether enough of a workload imbalance exists among the ANs of a given APG to initiate load shedding. For example, on the basis of the information available in peer metrics cache 222A regarding lower workload levels of ANs 212B and/or AN 212C, AN 212A may decide to terminate PCC 1.2 in the scenario depicted in FIG. 2, as indicated by the "X" symbol. In doing so, AN 212A may assume that the replacement PCC set up is more likely to be established with one of the other ANs (212B or 212C) than with AN 212A itself, although such a decision may not be guaranteed because the load balancer responsible for selecting an AN may not be making its decisions using the same input data and/or the same logic as AN 212A. Interactions among the load balancers, clients and ANs are discussed below with respect to FIG. 3.

Request/Response Pathway Details

Figure 3:
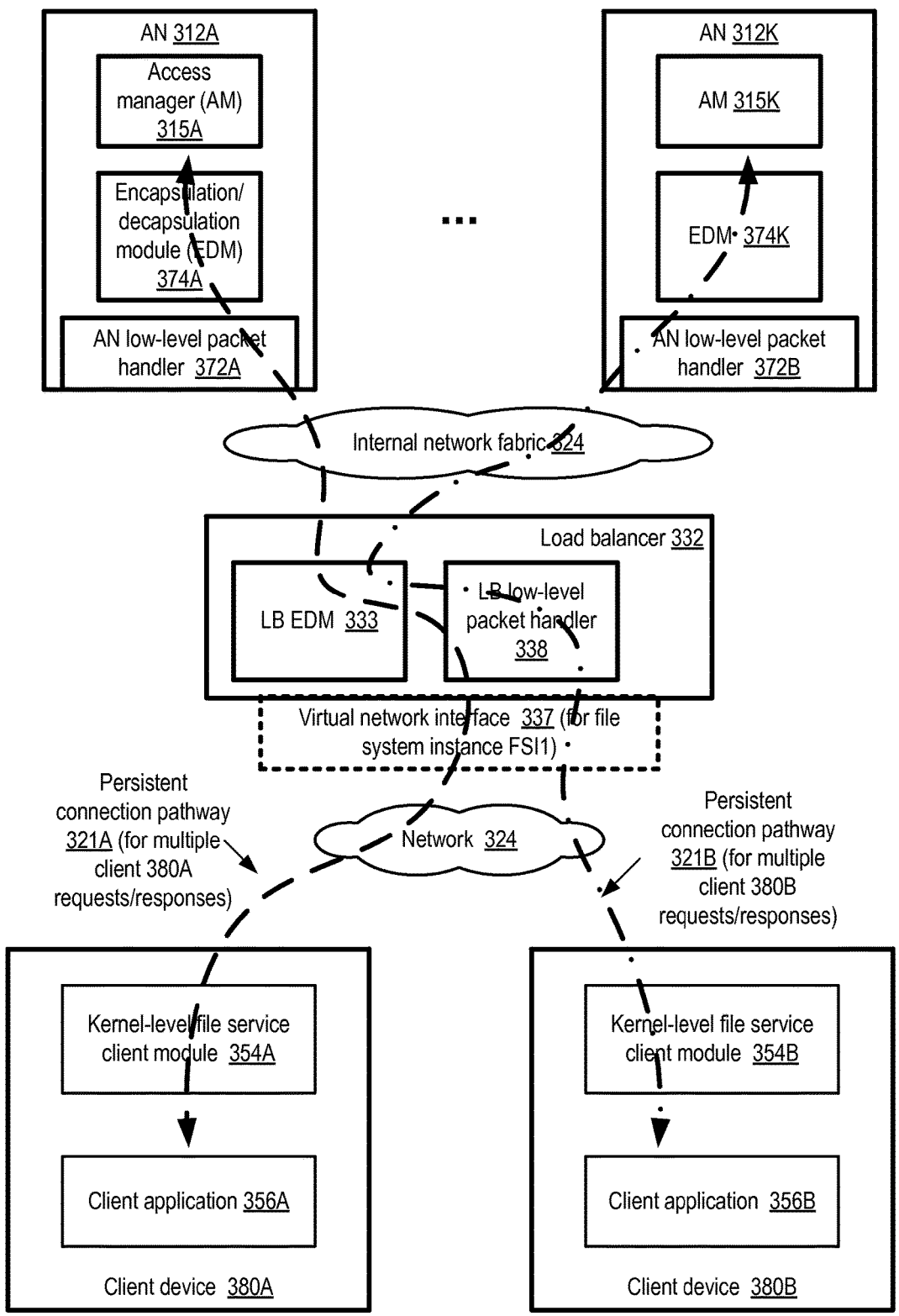
FIG. 3 illustrates examples of components which may be involved in request-response pathways between clients and access nodes of a distributed file storage service, according to at least some embodiments.

FIG. 3 illustrates examples of components which may be involved in request-response pathways between clients and access nodes of a distributed file storage service, according to at least some embodiments. In the depicted embodiment, a virtual network interface (VNI) 337 may be programmatically attached to a load balancer 332 to be used for client requests directed to a particular FSI (FSI1). Generally speaking, a VNI may comprise a logical entity with a set of networking and security-related attributes, which can be dynamically attached and detached from various entities of a provider network, including virtual or physical machines which may be used as load balancers 332. For example, at least one IP (Internet Protocol) address "IPaddr1" may be assigned to a given virtual network interface, and security rules restricting inbound and outbound traffic may be set for that VNI. When that VNI is programmatically attached to a given load balancer LB1 implemented at a host with a physical network interface card NIC1, network packets indicating IPaddr1 as their destination address (and complying with the security rules) may be received at the load balancer via NIC1. In addition, outbound packets generated at the load balancer may indicate IPaddr1 as their source address and may be physically transmitted towards their destinations via NIC1. If VNI1 is then programmatically detached from LB1 and attached to a different load balancer LB2 (which is executing at a different host with a different physical network interface card NIC2), the IPaddr1 traffic that was previously being received at LB1 may now be received at LB2, with the same security rules in place. Support for virtual network interfaces may considerably simplify various network configuration tasks required at provider networks.

At least one IP address assigned to VNI 337 may be exposed to enable clients to submit requests associated with FSI1 to the distributed file storage service. One or more load balancers 332 may be responsible for accepting traffic directed at the VNI's IP address at any given time. In at least some embodiments, the load balancers and/or the ANs may be implemented using compute instances (guest virtual machines) of a virtual computing service implemented at a provider network—e.g., a given LBN may comprise a process executing at a compute instance launched at a commodity hardware server.

In the depicted embodiment, respective client application instances 356A and 356B requiring access to FSI1 may run on client devices 380A and 380B. ANs 312A and 312K may be members of an AN peer group responsible for handling client requests directed to FSI1 via load balancer 332. The application-level requests to access FS1 may be intercepted at respective kernel-level client modules 354A and 354B at the two client devices. For example, the kernel-level client modules may each include some number of NFS client threads (or the logical equivalent of NFS client threads for the protocol being used) in some implementations. Kernel-level client module 354A may submit a request to load balancer 332A over the external network 324 to establish a persistent connection with an AN on behalf of the application instance 356A. In the depicted example scenario, the load balancer 332 has selected AN 312A (from the AN peer group set up for FSI1) for the module 354A, e.g., based on the load balancing criteria in effect at load balancer 332. The load balancer 332 may send a request for to establish an internal connection to AN 312A, and if the request is accepted at the AN 312A, such an internal connection that can be used for a sequence of requests generated at the client application may be set up. Similarly, in response to a connection request from kernel level client component 354B on behalf of application 356B, the load balancer may establish a persistent connection with AN 312B if AN 312B accepts the load balancer's internal connection request. A persistent connection pathway between a client device 380 and an AN 312 (e.g., pathway 321A for client device 380A, and pathway 321B for client device 380B) may thus comprise two lower-level connections: one between the client device and the load balancer, and one between the load balancer and the AN.

In at least some embodiments in which the ANs and/or the load balancers are implemented at compute instances of a virtual computing service, an encapsulation protocol may be used to manage the virtual-to-physical address translations required. In the depicted embodiment, load balancer 332 may include a module 333 responsible for encapsulation and de-capsulation of packets exchanged with the ANs 312, and the ANs may include respective encapsulation and de-capsulation modules 374 (e.g., EDM 374A at AN 312A, and EDM 374K at AN 312K). The lowest levels of the networking protocol stacks being used may be managed by respective low-level packet handlers—e.g., packet handler 338 at the load balancer, and packet handlers 372A and 372B at the ANs. The business logic of the access subsystem—e.g., the functions required to process client requests directed at FSI1—may be handled by respective access managers 315A and 315K at the two access nodes shown. After the contents of received packets corresponding to client requests have been extracted from their encapsulated versions at the EDMs 374, the access managers 315 may, for example, determine which specific metadata nodes and/or storage nodes have to be contacted to perform the requested operations. Any desired networking protocols (or combinations of protocols) may be used for the persistent client connections in various embodiments. In at least some embodiments, different networking protocols may be used for the two parts of a persistent client connection—e.g., TCP (Transmission Control Protocol) may be used for the connection between clients and the load balancers, and UDP (User Datagram Protocol) may be used for the connection between the load balancers and the access nodes.

In various embodiments, either the client (the kernel-level component and/or the application-level component), the AN, or the load balancer may be able to initiate the termination or closure of a persistent connection established on behalf of a client. In the depicted embodiment, if a PCC established between a kernel-level client module 354 and the AN 312 is closed at the initiative of the AN or the load balancer, the kernel-level client module may request the establishment of a replacement connection by sending a request to the load balancer. The load balancer may respond to the request for the replacement connection just as it responded to the request for the original (now terminated) connection—that is, it may select an AN for the request based on the load balancing algorithm it is using. Thus, at least in some embodiments, if a particular AN closes a persistent client connection, that AN may have little or no control over the AN selection methodology used for the replacement connection. While the load shedding technique employed by the AN may often result in the selection of a different AN for a replacement PCC, this may not always be the case. In some embodiments, load balancers may not be employed, and connections may be established directly between client devices and access nodes.

Load Shedding Example

Figure 4A:
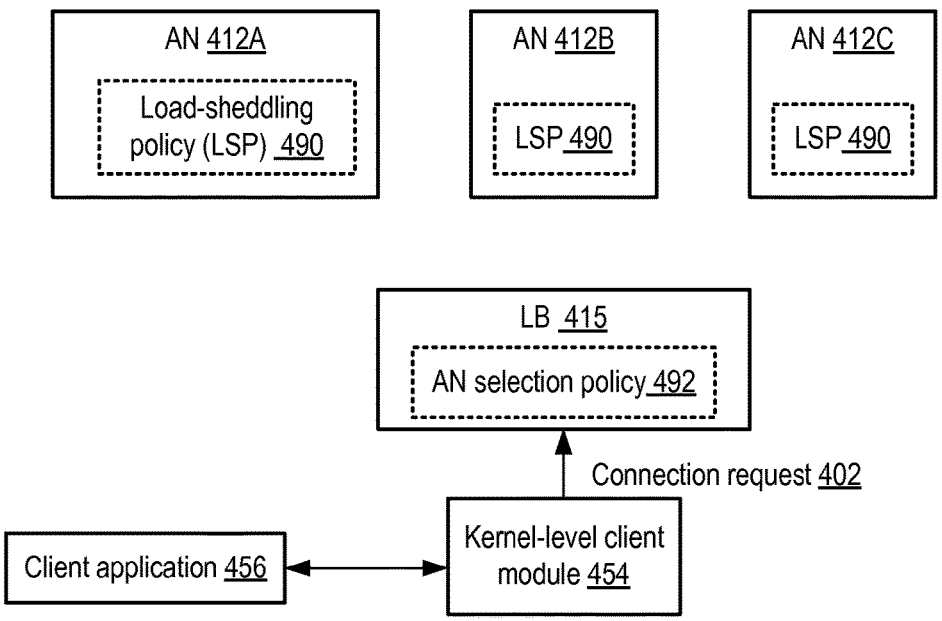
FIG. 4a-FIG. 4h collectively illustrate an example sequence of operations that may be performed to implement a load shedding technique involving a phased closure of a persistent connection between a client device and an access node, according to at least some embodiments.
Figure 4B:
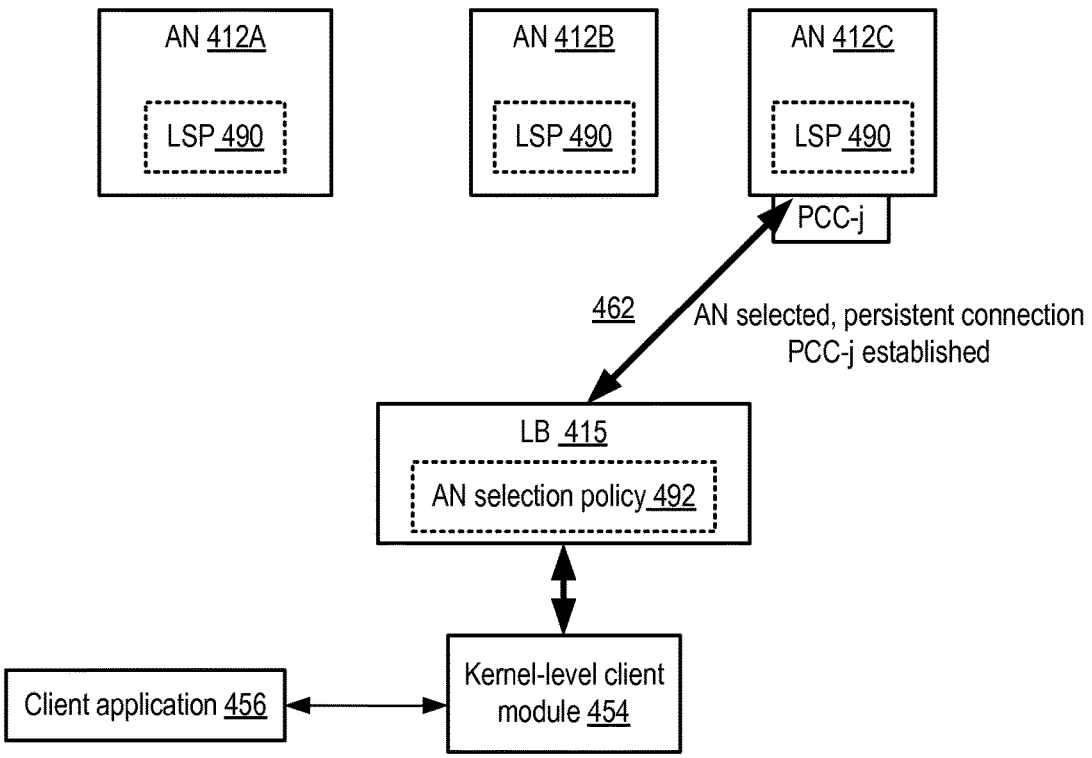
Figure 4C:
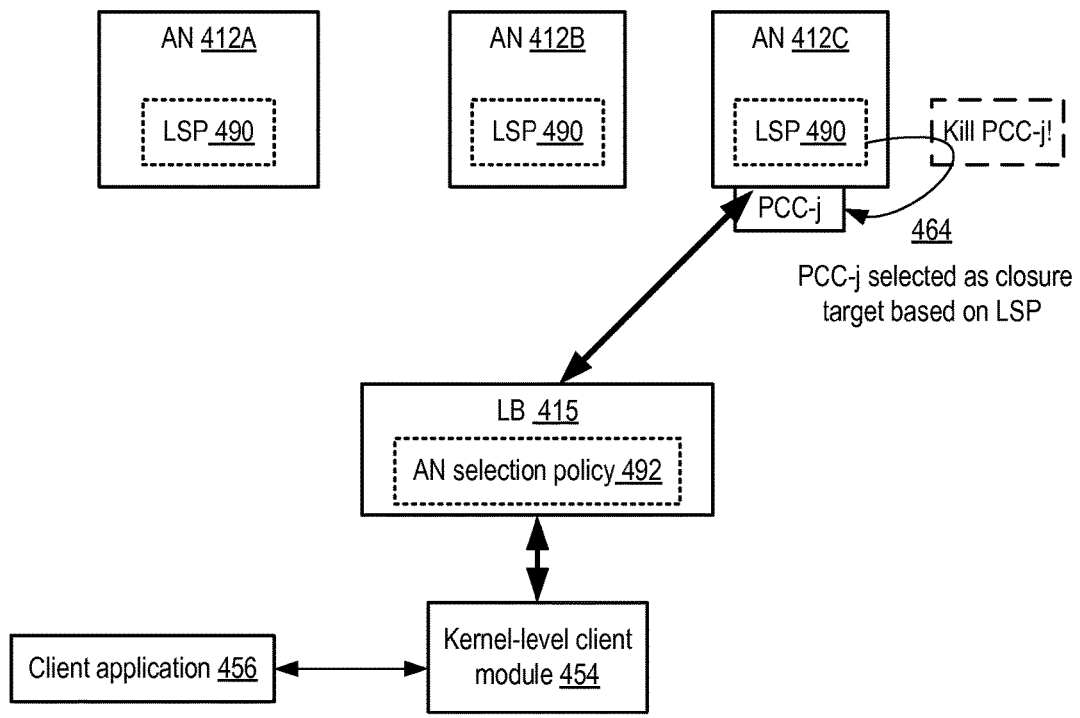
Figure 4D:
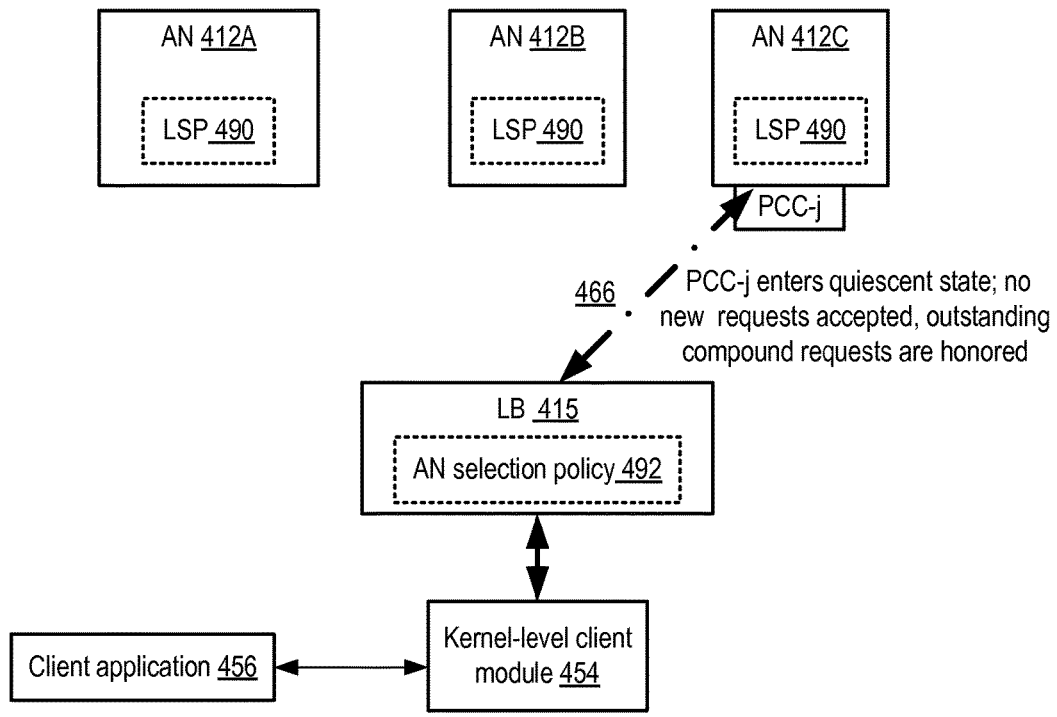
Figure 4E:
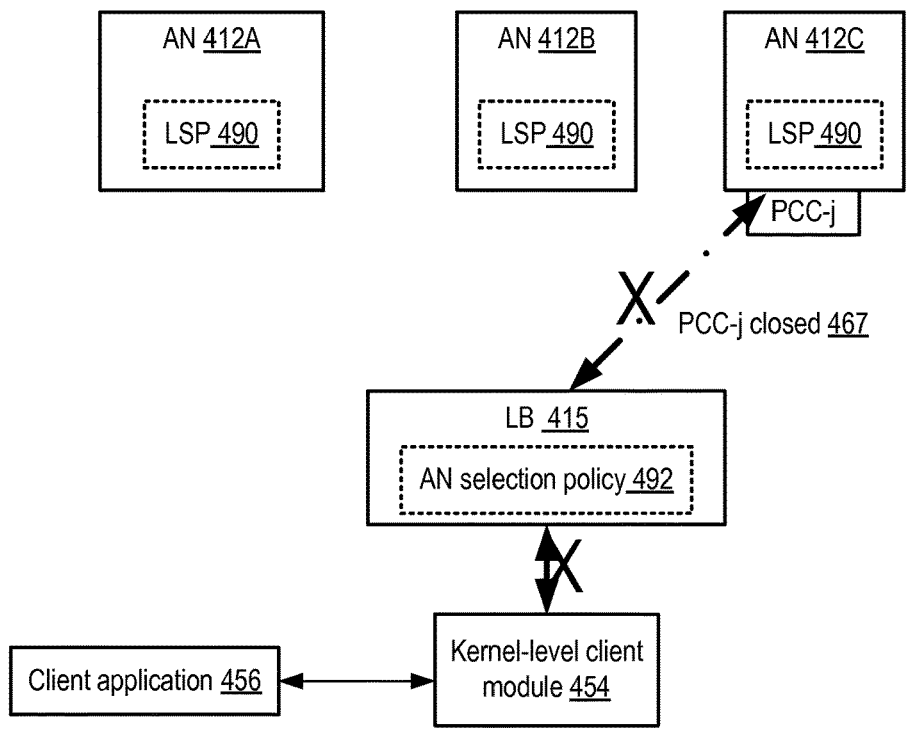
Figure 4F:
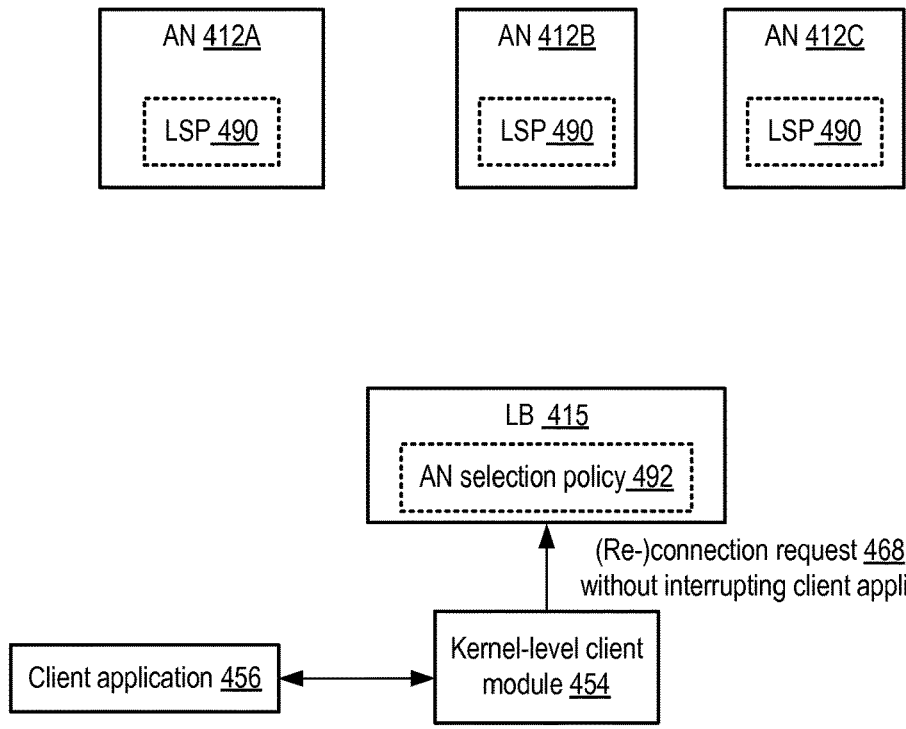
Figure 4G:
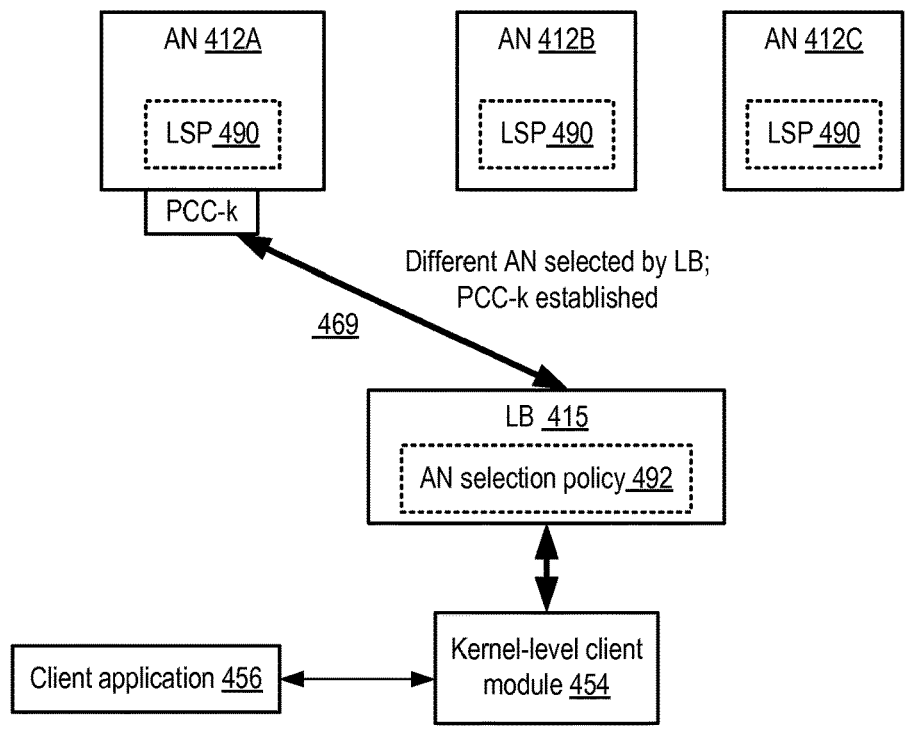
Figure 4H:
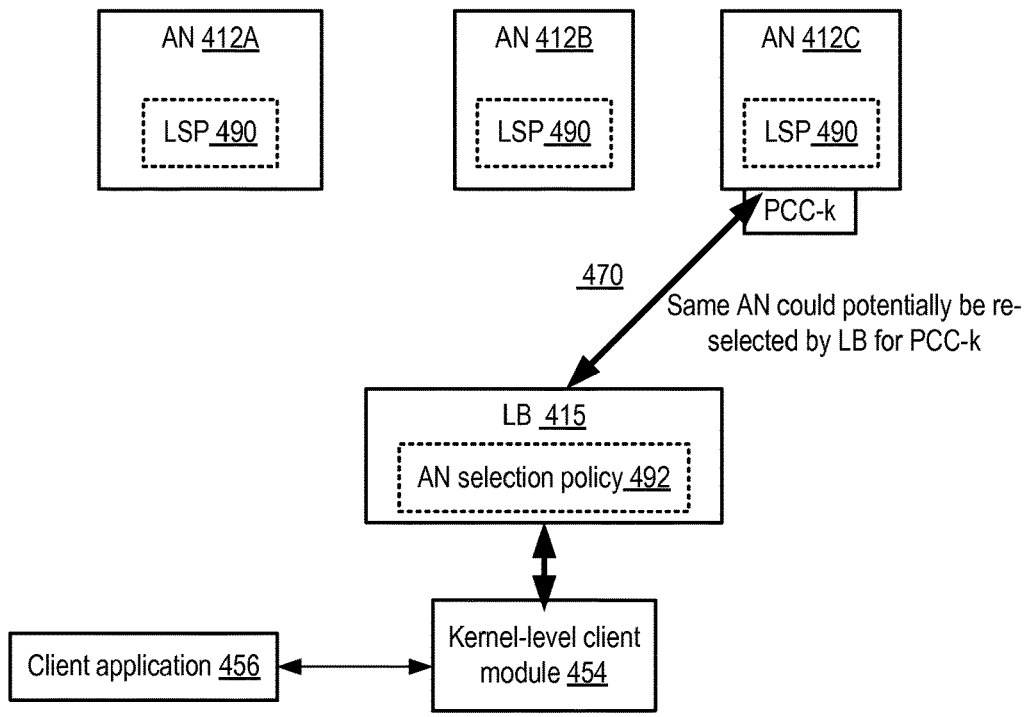

FIG. 4*a*-FIG. 4*h* collectively illustrate an example sequence of operations that may be performed to implement a load shedding technique involving a phased closure of a persistent connection between a client device and an access node, according to at least some embodiments. As shown in FIG. 4*a*, an access node peer group comprising ANs 412A, 412B and 412C, each implementing load shedding policy (LSP) 490, may be set up to enable client accesses directed to a particular file system instance. In general, requests to read and/or write file system objects may originate at client application 456, and be passed from the application layer to a kernel-level client module 454. If the kernel-level client module has not already established a connection with the DFSS, it may send a connection request 402 to a load balancer 415 (e.g., using an IP address of a virtual network interface attached to the load balancer 415, which may have been provided as an endpoint to the kernel-level client module during the initialization phase of the file system instance being used). The load balancer 415 may use AN selection policy 492 to identify AN 412C as the node to be used for requests from module 454. For example, the load balancer may keep track of how many connections it has established with each of the ANs, and choose AN 412C based on the fact that AN 412C appears to have the lowest number of PCCs. Other factors and metrics, such as response times, request rates, throughput and the like may be used by the AN selection policy 492 in various embodiments.

If AN 412C accepts the request to establish the connection from load balancer 415, persistent client connection PCC-j may be established and used for a series of requests from client application 456, as indicated by arrow 462 of FIG. 4b. (If AN 412C rejects the connection, load balancer 415 may choose another AN in accordance with the AN selection policy). Each of the ANs may periodically perform a load shedding analysis iteration in accordance with LSP 490. In many cases, a given PCC such as PCC-j may never be selected as a victim connection for load shedding—e.g., the workload level at AN 412C may never each the triggering level required for terminating PCCs before PCC-j is eventually closed at the initiative of the client, or other PCCs may be selected as victims based on the LSP 490.

As indicated by arrow 464 of FIG. 4c, it may be the case that in some LSAI, PCC-j is eventually selected as the connection to be closed or killed, using a phased or gradual closure procedure. PCC-j may then be placed in a quiescent state, as indicated by arrow 466 of FIG. 4d. Any new requests (e.g., reads or writes) received after PCC-j is quiesced may be rejected, and outstanding requests may be allowed to complete in the depicted embodiment. Depending on the file system protocol in use, some long-lasting requests (e.g., requests similar to NFS version 4's compound RPCs) which include multiple reads and/or writes may have been in progress at the time that PCC-j was quiesced, in which case the processing of those requests may be completed. In at least one embodiment, PCC-j may be closed (as indicated by 467 in FIG. 4e) at the earlier of (a) an expiration of a timeout period started at the time that PCC-j is placed in quiesced state or (b) the completion of outstanding requests which were received via PCC-j and were in progress when PCC-j was quiesced.

Upon determining that PCC-j has been closed, the kernel-level client component 454 may issue a re-connection request 468 to the load balancer, as indicated in FIG. 4f. It is noted that the application-level components at the client device may not necessarily be made aware that PCC-j has been closed; thus, client applications 456 may at least in some implementations typically proceed without interruptions, despite the termination of the PCCs at the initiative of the ANs. In response to the re-connection request 468, the load balancer may once more exercise AN selection policy 492. In many cases, a different AN (such as AN 412A) may be selected for the replacement PCC, PCC-k, as indicated by arrow 469 of FIG. 4g. The probability that a different AN (e.g., 412A) is chosen by the load balancer after a PCC is terminated by a given AN (e.g., 412C) may generally be higher if the AN selection policy 492 and the load shedding policy 490 are in alignment—e.g., if the two policies take the same kinds of factors into account, and if the data used for the load shedding decision and the AN selection decision were collected at about the same time. In some cases, however, the load balancer 415 may choose the same AN (412C) for the replacement connection as was being used for the terminated connection, as indicated by arrow 470 of FIG. 4h. In some embodiments, in order to avoid frequent connection terminations which may result from AN selections of the kind shown in FIG. 4h, an AN may refuse to accept new connection requests (at least for the same FSI for which that AN has recently terminated a PCC) for some selected time periods.

Example Metrics

Figure 5:
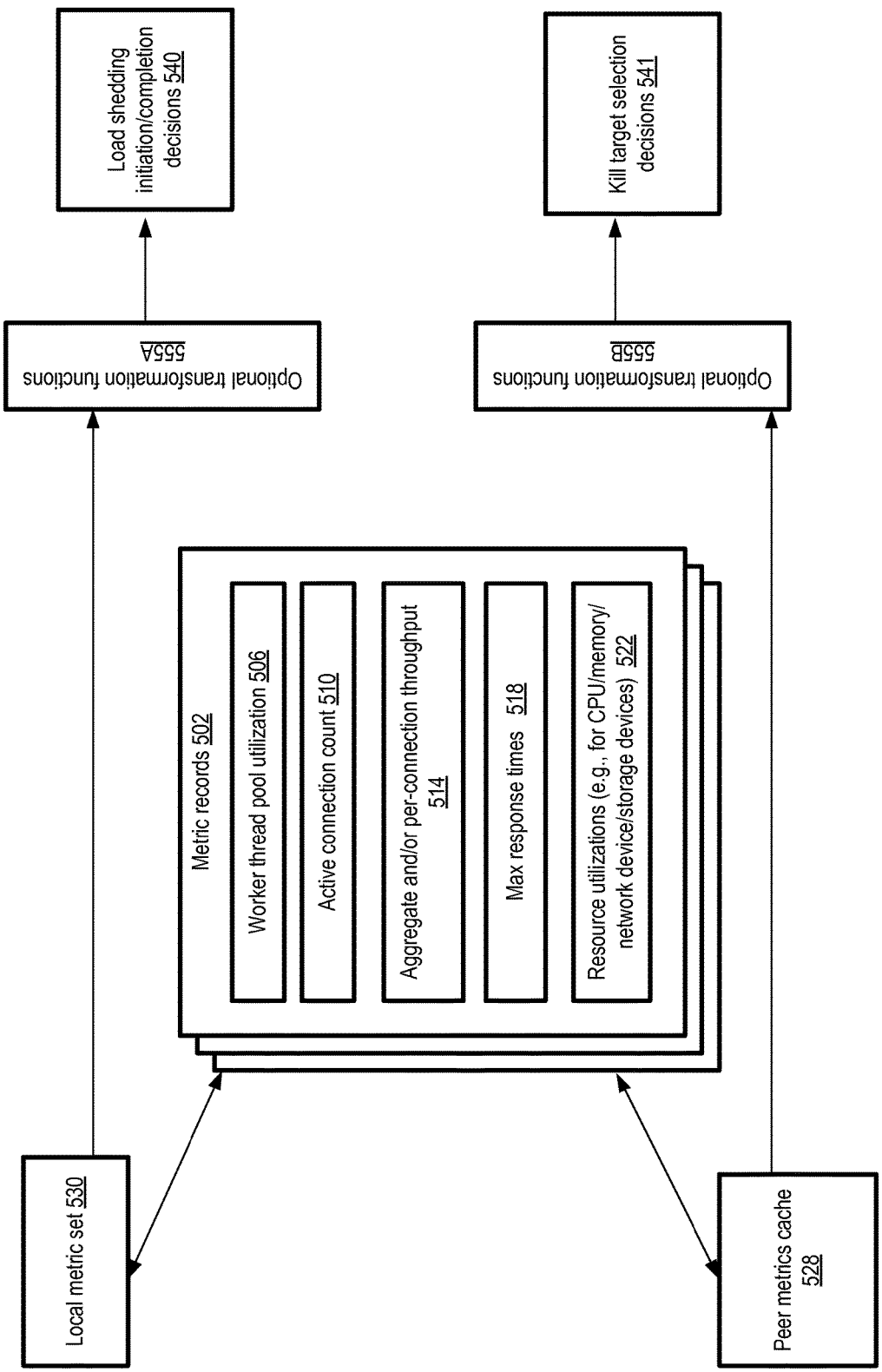
FIG. 5 illustrates examples of metrics which may be used for initiating load shedding analysis and/or selecting victim connections to be terminated during load shedding, according to at least some embodiments.

FIG. 5 illustrates examples of metrics which may be used for initiating load shedding analysis and/or selecting victim connections to be terminated during load shedding, according to at least some embodiments. As shown, local metrics 530 accumulated at an AN may contain a plurality of metric records 502. A given metric record 502 may comprise, for example, snapshots taken at various points in time of worker thread pool utilizations 506, active connection counts 510, aggregate and/or per-connection throughput measurements 514, maximum response times 518, or resource utilization levels (e.g., for CPUs/cores, memory, network devices and/or storage devices). In some embodiments, similar types of entries may be stored in a peer metrics cache 528 for which data is obtained from workload information distributors (WIDs). In other embodiments, the kinds of metrics collected locally may differ from those obtained for other ANs. In at least one embodiment, the metrics regarding peer ANs may have been summarized by the WIDs, and may not have as much detail as the local metrics.

In the embodiment depicted in FIG. 5, optional transformation functions 555A and/or 555B may be applied to the local metrics and/or the peer metrics to make the decisions regarding PCC closure (e.g., load shedding initiation and completion decisions 540, and kill target selection decisions 541). For example, a time-weighted average of the local metrics may be obtained in some implementations, in which more recent metrics are weighted higher than older metrics. If the transformed local metrics meet the triggering conditions to begin searching for PCC victims, the AN may use the peer metrics to identify PCCs for which enough available capacity exists at other ANs as discussed above. If one or more such PCCs are found, the AN may initiate the phased closure procedure by placing the PCCs in quiescent states. In at least some embodiments, the local metric set may be used to determine when enough PCCs have been chosen for termination, i.e., when the AN should stop its search for additional victims during a given load shedding analysis iteration. For example, one of the criteria for stopping the search may be based at least in part on the active connection count 510.

DFSSs Spread Across Multiple Availability Containers

As mentioned earlier, in some embodiments a distributed file storage service may be implemented using resources of a provider network, and may be used at least partly for file-related operations by applications or clients running at compute instances of the provider network. In some embodiments a provider network may be organized into a plurality of geographical regions, and each region may include one or more availability containers, which may also be termed "availability zones" herein. An availability container in turn may comprise one or more distinct locations or data centers, engineered in such a way (e.g., with independent infrastructure components such as power-related equipment, cooling equipment, and physical security components) that the resources in a given availability container are insulated from failures in other availability containers. A failure in one availability container may not be expected to result in a failure in any other availability container; thus, the availability profile of a resource is intended to be independent of the availability profile of resources in a different availability container. Various types of applications may be protected from failures at a single location by launching multiple application instances in respective availability containers. Nodes of the various subsystems of the storage service may also be distributed across several different availability containers in some embodiments, e.g., in accordance with the availability/uptime goals of the service and/or the data redundancy requirements for various file system instances. At the same time, in some implementations, inexpensive and low latency network connectivity may be provided between resources (such as the hosts or storage devices being used for the distributed file storage service) that reside within the same geographical region, and network transmissions between resources of the same availability container may be even faster. Some customers may wish to specify the locations at which at least some of the resources being used for their file systems are reserved and/or instantiated, e.g., at either the region level, the availability container level, or a data center level, to maintain a desired degree of control of exactly where various components of their applications are run. Other customers may be less interested in the exact location where their resources are reserved or instantiated, as long as the resources meet the customer requirements, e.g., for performance, high availability, and so on.

In at least some embodiments, the resources within a given data center may be further partitioned into sub-groups based on differences in expected availability or failure resilience levels. For example, one or more server racks at a data center may be designated as a lower-level availability container, as the probability of correlated failures within a rack may at least in some cases be higher than the probability of correlated failures across different racks. At least in some embodiments, when deciding where to instantiate various components or nodes of the storage service, any combination of the various levels of availability containment described (e.g., the region level, the data center level, or at the rack level) may be taken into account together with performance goals and durability goals. Thus, for some types of storage service components, redundancy/replication at the rack level may be considered adequate, so in general different racks may be used for different components providing the same function (or storing replicas of the same data/metadata). For other components, redundancy/replication may also or instead be implemented at the data center level or at the region level.

Figure 6:
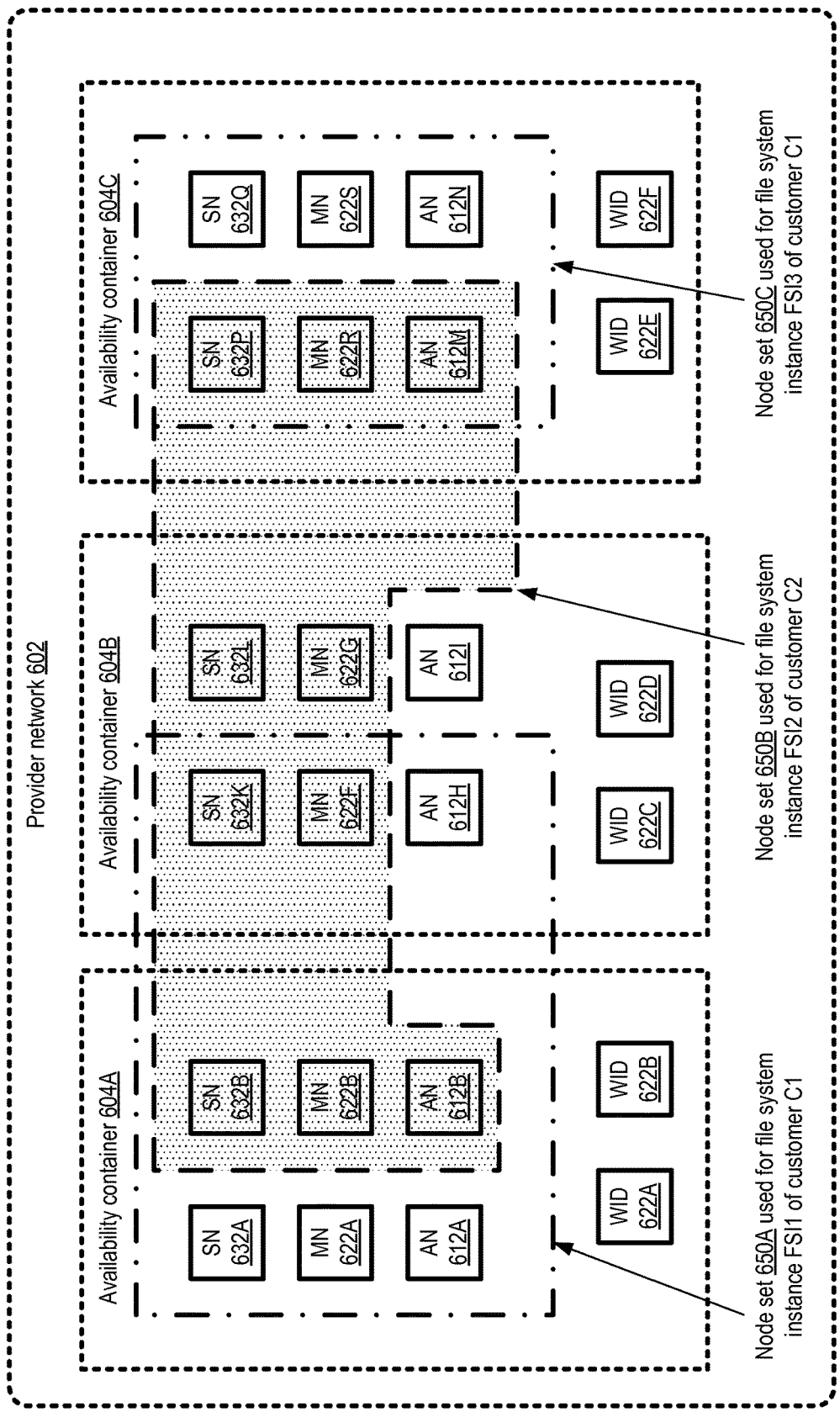
FIG. 6 illustrates an example of a distribution of components of a distributed file storage service among a plurality of availability containers of a provider network, according to at least some embodiments.

FIG. 6 illustrates an example of a distribution of components of a distributed file storage service (DFSS) among a plurality of availability containers of a provider network, according to at least some embodiments. In the embodiment depicted, three availability containers 604A, 604B and 604C of a provider network 602 are shown, each of which comprise some number of storage nodes, metadata nodes, access nodes and workload information distributor (WID) nodes of the storage service. Since each availability container is typically set up so as to prevent correlated failure events that cross availability container boundaries, the set of DFSS nodes that are assigned to a given file system instance may typically be spread across different availability containers. It is noted that some file system instances may have lower availability or durability requirements than others, and may therefore be implemented within a single availability container in at least some embodiments. In one embodiment, when the DFSS is set up, a pool of nodes may be established for each of the three subsystems in each of several availability containers 604, from which specific nodes may be assigned to a given FSI as needed. In other embodiments, instead of establishing pre-configured storage service node pools, new nodes may be instantiated as needed.

The collection of access node (ANs), metadata nodes (MNs) and storage nodes (SNs) that collectively implement file storage for a given FSI may be referred to as a "node set" 650 for that FSI. In the embodiment shown in FIG. 6, the nodes of the DFSS are multi-tenant, in that a given node of any of the subsystems may be responsible for handling requests from several different client devices and/or several different customers. It is noted that in various embodiments, a given customer (e.g., a business entity or individual on whose behalf a billing account has been established at the storage service) may set up several different FSIs, and that many different client devices (computing devices from which DFSS programmatic interfaces may be invoked) may be used to issue file service requests to a single FSI by, or on behalf of, a given customer. In at least some embodiments, multiple user accounts (e.g., one or more user accounts for each of several employees of a customer business organization) may be set up under the aegis of a single billing account, and each of the user accounts may submit file storage requests from a variety of client devices.

Node set 650A of FIG. 6, used for file system instance FSI1 of customer C1, comprises SNs 632A, 632B and 632K, MNs 622A, 622B and 622F, and ANs 612A, 612B and 612H, distributed among two availability containers 604A and 604B. Node set 650B, used for file system instance FSI2 of a different customer C2, comprises nodes in three availability containers 604A, 604B and 604C: SNs 632B, 632K, 632L and 632P, MNs 622B, 622F, 622G and 622R, and ANs 612B and 612M. Node set 650C, used for file system instance FSI3 of customer C1, uses nodes of availability container 604C alone: SNs 632P and 632Q, MNs 622R and 622S, and ANs 612M and 612N. The specific nodes that are to be used for a given FSI may be selected on demand based on various factors, e.g., by a placement component of the storage service, and the node set may change over time in view of changing storage space needs, performance needs, failures and the like. A given storage device at a single storage node may store data and/or metadata belonging to different clients in at least some embodiments.

In addition to the ANs, MNs and SNs, each availability container 604 may comprise some number of WIDs in the depicted embodiment. For example, WIDs 622A and 622B are set up in availability container 604A, WIDs 622C and 622D are set up in availability container 604B, and WIDs 622E and 622F are set up in availability container 604C. Each WID 622 may obtain workload metrics from some set of ANs and distribute aggregated versions of the metrics to some or all of the ANs. In at least some embodiments, a given WID 622 may communicate with other WIDs within its availability container and/or across availability container boundaries. In the latter scenario, the WIDs may serve as the conduits of workload information among different availability containers 604. In at least some embodiments, multiple WIDs may be configured as failover peers—e.g., if WID 622A fails or loses connectivity to its set of ANs, the responsibilities of WID 622A may be taken over by WID 622B. By establishing multiple WIDs in different availability containers, a high level of availability and failure resiliency may be supported for load shedding techniques in the depicted embodiment. In at least some implementations, a particular WID 622 may also be configured to take over metric distribution for ANs in other availability containers—e.g., if both WIDs 622A and 622B fail, WID 622C may start collecting and distributing metrics for ANs of availability container 604A.

In at least some embodiments in which multiple ANs of an AN peer group may be established within a given availability container 604, the PCC victim selection decisions may take the location of the peer ANs into account. For example, in one embodiment, when deciding whether a particular PCC (PCC-j) established for an FSI FSI-a should be terminated, a particular AN such as 612A may first determine whether other ANs which are (a) designated for FSI-a and (b) present in the same availability container 604A as 612A meet a first intra-availability-container available-capacity criterion. If there are other ANs within the same availability container and they collectively or individually meet the intra-availability-container available-capacity criterion, PCC-j may be selected as a victim to be terminated. If the intra-availability-container available-capacity criterion is not met, AN 612A may then use an inter-availability-container available-capacity criterion to decide whether ANs in other availability containers are likely to be able to handle the replacement PCC that would be set up for PCC-j. If the inter-availability-container criterion (which may differ from the intra-availability-container criterion) is met, PCC-j may be terminated as described earlier. In other embodiments, termination victims may be selected only if the AN estimates that sufficient capacity for a replacement PCC exists within its own availability container.

Methods for Load Shedding

Figure 7:
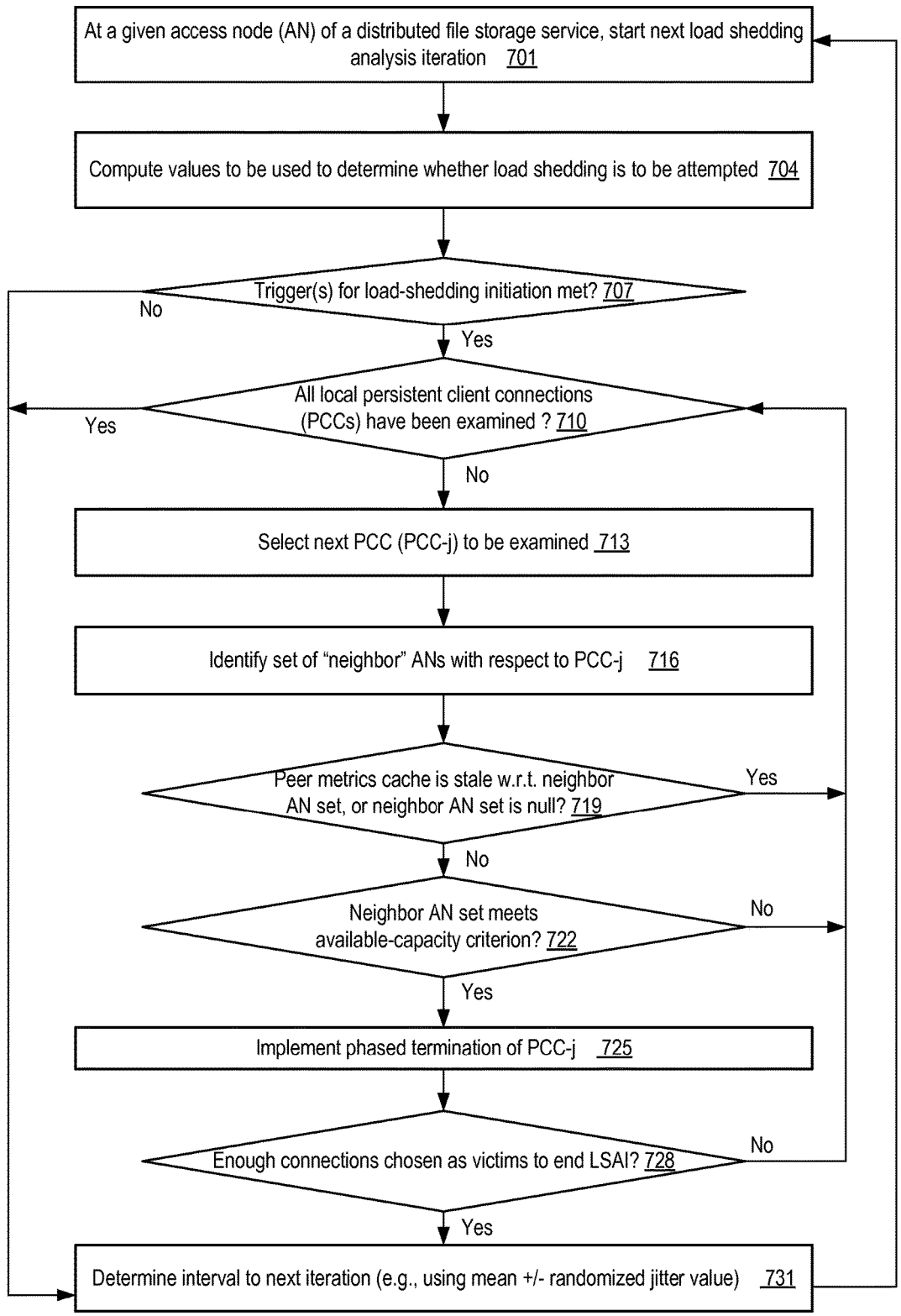
FIG. 7 is a flow diagram illustrating aspects of operations that may be performed at an access node configured to implement a first technique for load shedding, according to at least some embodiments.

FIG. 7 is a flow diagram illustrating aspects of operations that may be performed at an access node configured to implement a first technique for load shedding, according to at least some embodiments. As shown in element 701, a load shedding analysis iteration (LSAI) may be started periodically at a particular access node (AN) of a distributed file storage service at which client requests are handled via persistent client connections (PCCs), with each PCC potentially being used for numerous different reads and/or write requests. During the LSAI, the AN may make a number of different decisions in the depicted embodiment, starting with a first decision as to whether it should attempt to identify PCCs to be closed or terminated as load shedding victims. The AN may compute or update local workload metrics to be used for the first decision (element 704). As mentioned earlier with respect to FIG. 5, a variety of local workload metrics may be collected in different embodiments, including worker thread pool utilization, aggregated and/or per-PCC throughput, total number of active connections, response times for various file system operations, and/or utilization metrics of resources such as CPUs, memory, disks, network devices and the like. Snapshots of one or more such metrics may be collected, say once every few seconds, in some implementations. In at least some embodiments, one or more transformation functions may be applied to some or all of the raw local metrics snapshots. For example, smoothing functions selected to reduce the impact of outlier metrics may be used, and at least in some cases higher weights may be assigned to more recent metrics than are assigned to older metrics in accordance with a time-decay factor.

Using the transformed (or raw) local metrics, the AN may determine whether one or more triggering conditions for initiating load-shedding have been met (element 707). For example, if the throughput over the last T seconds exceeds some threshold, or if the total number of active PCCs over the last T seconds exceeds some threshold, the AN may conclude that it is sufficiently overloaded that searching for one or more victim PCCs is worthwhile. PCCs that are examined or considered for termination by the AN may be termed "kill candidates" herein. If the triggers for initiating the search for kill candidates are not met, as also detected in element 707, the AN may determine the time interval until the next LSAI (element 731) and perform its normal operations (e.g., handling connection requests, client service requests, and the like, which are not directly associated with load shedding) until the time interval has passed, at which point the next LSAI may be started (element 701 onwards). In at least some embodiments, an element of randomness may be added to the inter-LSAI delay—e.g., a mean inter-LSAI interval length plus or minus a smaller random "jitter" value may be used.

In the depicted embodiment, during a given LSAI, the AN may consider each of its PCCs as a potential kill candidate in some selected order, until there are no more PCCs left to consider or until sufficient PCCs have been identified as victims. As shown in element 710, after no more local PCCs remain to be analyzed, the AN may terminate the current LSAI and determine the interval to the next LSAI (element 731). If PCCs that have not been considered remain (as also determined in element 710), the AN may select the particular PCC (PCC-j) to be evaluated next (element 713). In some embodiments, PCC-j may be selected at random, while in other embodiments, the PCCs may be sorted (e.g., in order of decreasing or increasing per-PCC throughput metrics) and examined in sorted order.

A set of "neighbor" ANs may be identified with respect to PCC-j (element 716). An AN may be considered a neighbor, for example, if the AN is also responsible for handling client requests pertaining to the same file system instance for which PCC-j was set up. In some embodiments, other criteria such as geographical proximity and/or availability container locality may be used—e.g., only those ANs of the peer group set up for the FSI which also happen to be present in the same availability container or data center as the AN which is conducting the LSAI may be considered neighbors. The AN implementing the LSAI may use its cache of peer metrics when identifying neighbor ANs and determining whether the neighbors have enough capacity for PCC-j to be selected as a victim for closure. In at least some embodiments, the peer metrics cache may be updated periodically, and it may be the case that the information present in the cache (at least with respect to one or more of the specific neighbors being considered) has not been updated within a threshold time window. If the cache entries for the neighbor set happen to be stale, and/or of the neighbor AN is null (that is, if no neighbor ANs can be identified, or not entries for the neighbors are present in the cache) (element 719), the AN may not select PCC-j as a victim in the depicted embodiment. Instead, the AN may turn its attention to the next kill candidate PCC-j.

If, however, the peer metrics cache does contain "fresh" (non-stale) information about the neighbor set (as also determined in element 719), and the neighbor set appears to have enough available capacity to handle a replacement PCC (as determined in element 722), PCC-j may be designated as a victim, and a phased termination or closure process for PCC-j may be begun (element 725) in the depicted embodiment. The decision as to whether the neighbor set has enough available capacity may be considered probabilistic rather than fully deterministic, in that (a) the conditions at any given AN may be changing fairly quickly and (b) the future workload generated for a replacement PCC may vary from the past workload of the victim PCC-j. Furthermore, the decision regarding available capacity may be made for a group of neighbors considered collectively in at least the depicted embodiment (e.g., not with respect to any specific neighbor AN), and as a result it may be the case that no single neighbor AN may turn out to be capable of handling PCC-j's replacement workload. In various embodiments, the victim PCC such as PCC-j may be placed in a quiescent state for some time before it is fully closed. In the quiescent state, new requests for certain types of operations (such as new writes or new reads) may be rejected, while outstanding requests (e.g., compound requests which may have begun before the PCC was quiesced) may be allowed to complete, e.g., as long as they do not take more time than a designated time-out interval.

After PCC-j's phased closure is initiated, the AN may determine whether enough PCC victims have been identified to terminate the LSAI (element 728). For example, in some embodiments, no more than X PCC's may be terminated (or selected for termination) during a given LSAI, or only enough PCCs may be terminated during a given LSAI to meet a throughput reduction criterion. If insufficient PCCs have been identified as victims, the next PCC may be examined as a kill candidate, and the operations corresponding to elements 710 onwards may be repeated. If sufficient PCCs have been selected as victims, the current LSAI may be terminated and the AN may determine how long to wait before starting the next LSAI (element 731). In at least some embodiments, if the AN determines (e.g., in operations corresponding to element 707) that its workload has met the threshold for load shedding attempts, this may have an impact on other operations of the AN which may not be related directly to load shedding per se. For example, the AN may reject incoming connection requests during the remainder of the LSAI in some embodiments.

Figure 8:
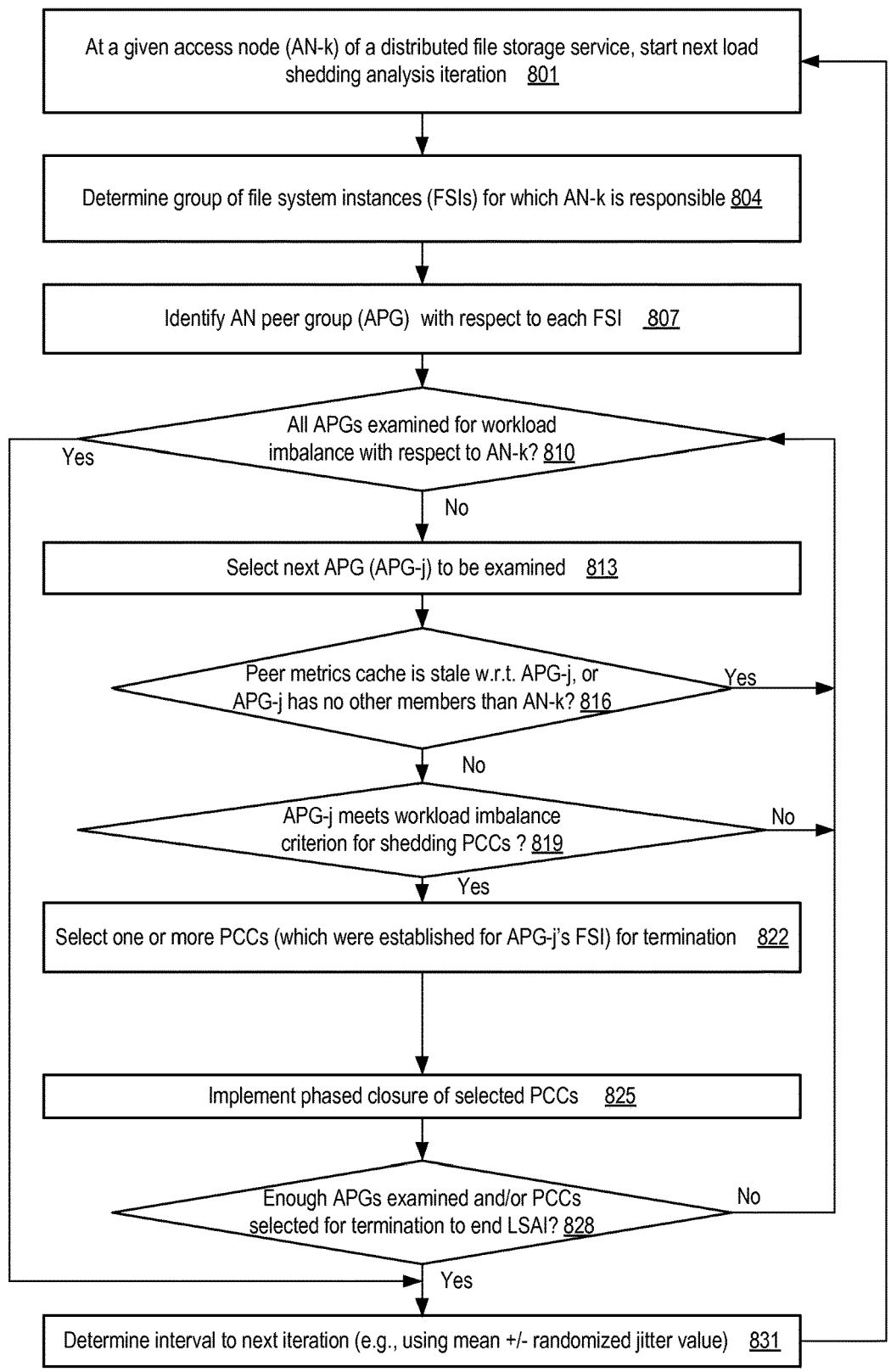
FIG. 8 is a flow diagram illustrating aspects of operations that may be performed at an access node configured to implement a variation of the technique illustrated in FIG. 7 for load shedding, according to at least some embodiments

FIG. 8 is a flow diagram illustrating aspects of operations that may be performed at an access node configured to implement a variation of the technique illustrated in FIG. 7 for load shedding, according to at least some embodiments. In the depicted variation, instead of first examining local workload metrics as potential triggers for load shedding (as in FIG. 7), an access node may first try to ascertain whether a workload imbalance exists among the members of a peer group of access nodes, and use an indication of such an imbalance to trigger load shedding. As shown in element 801, a load shedding analysis iteration (LSAI) may be started at a particular access node (AN-k) of a service at which persistent connections (e.g., with each connection intended to be used for multiple requests and/or multiple responses) are established for communication with clients. AN-k may identify a group of one or more file system instances (FSIs) for which it (AN-k) is responsible (element 804). In some implementations, AN-k may sort the FSIs, e.g., based on the number of distinct persistent client connections (PCCs) established locally for the respective FSIs, or based on the aggregated local throughput associated with the respective FSIs.

AN-k may be a member of a respective AN peer group (APG) corresponding to each such FSI in the depicted embodiment—e.g., if AN-k handles requests for M FSIs, AN-k may belong to M APGs (although in some cases the same APG may be used for more than one FSI, in which case AN-k may belong to fewer than M distinct APGs). The APGs corresponding to the various FSIs may be identified (element 807). AN-k may then examine the peer metrics cache entries associated with the various APGs to determine whether a workload imbalance appears to exist with respect to AN-k and any of the APGs, and implement one or more load shedding operations on respective PCCs of an imbalanced APG if such an imbalance is detected. As part of its analysis, AN-k may determine whether all the APGs have been examined (element 810) in the depicted embodiment. If no more APGs need to be considered, the current LSAI may be terminated, and the interval after which the next LSAI is to be scheduled may be determined (element 831), e.g., based on some mean value and a randomized jitter value in a manner similar to that indicated in element 731 of FIG. 7. If at least one APG remains to be examined, AN-k may identify the particular APG (APG-j) is to be analyzed next (element 813), e.g., based on the kind of sorting indicated above, or in random order. If the peer metrics cache is stale with respect to APG-j, or does not have any entries pertaining to APG-j (as detected in element 816), AN-k may proceed to the next APG. If the peer metrics cache includes enough non-stale information for AN-k to determine that a workload imbalance exists between itself (AN-k) and other ANs of APG-j, and if the imbalance can be addressed by terminating one or more of AN-k's PCCs (as determined in element 819), AN-k may identify one or more of its local PCCs corresponding to APG-j that should be closed (element 822). (It is noted that there may be cases in which AN-k detects a workload imbalance, but the imbalance may not be addressable by closing any local PCCs— e.g., AN-k may be under-loaded with respect to the average workload of APG-j, so terminating a local connection may not be helpful in reducing the imbalance). The particular set of PCCs to be closed may be selected, for example, in order of descending per-PCC throughput or in random order. If AN-k identifies one or more local PCCs to be terminated, a phased closure of the selected PCCs may be implemented (element 825) in a manner similar to that discussed above. If, based on criteria associated with LSAI completion, enough APGs have been examined, or enough victim PCCs have been identified (as detected in element 828) the current LSAI may be ended (and the interval to the next LSAI may be computed as indicated in element 831). Otherwise, if the current LSAI is to continue, operations corresponding to elements 810 onwards may be repeated.

It is noted that in various embodiments, some of the operations shown in the flow diagram of FIG. 7 and/or FIG. 8 may be omitted or performed in a different order than that shown, or may be performed in parallel rather than serially. For example, more than one PCC may be examined as a potential kill candidate in parallel in some embodiments, or more than one APG may be examined for workload imbalance in parallel.

Use Cases

The techniques described above, of implemented a low-overhead probabilistic algorithm independently at various nodes of a distributed service to determine whether to close persistent client connections under overload conditions may be useful in several different scenarios. For example, in environments where file storage operation performance is expected to scale with the size of the file system instances, the service may be designed to ensure that sufficient resources are allocated to growing file systems in a balanced fashion, while at the same time ensuring that individual client connections are provided at least a minimum level of service. By using intermediary workload information distributor intermediaries and avoiding strict synchronization between the load shedding-related decision-making entities, the overhead of the load shedding techniques may be kept quite low, unlike in environments in which locks or other heavyweight consistency mechanisms are used.

Illustrative Computer System

Figure 9:
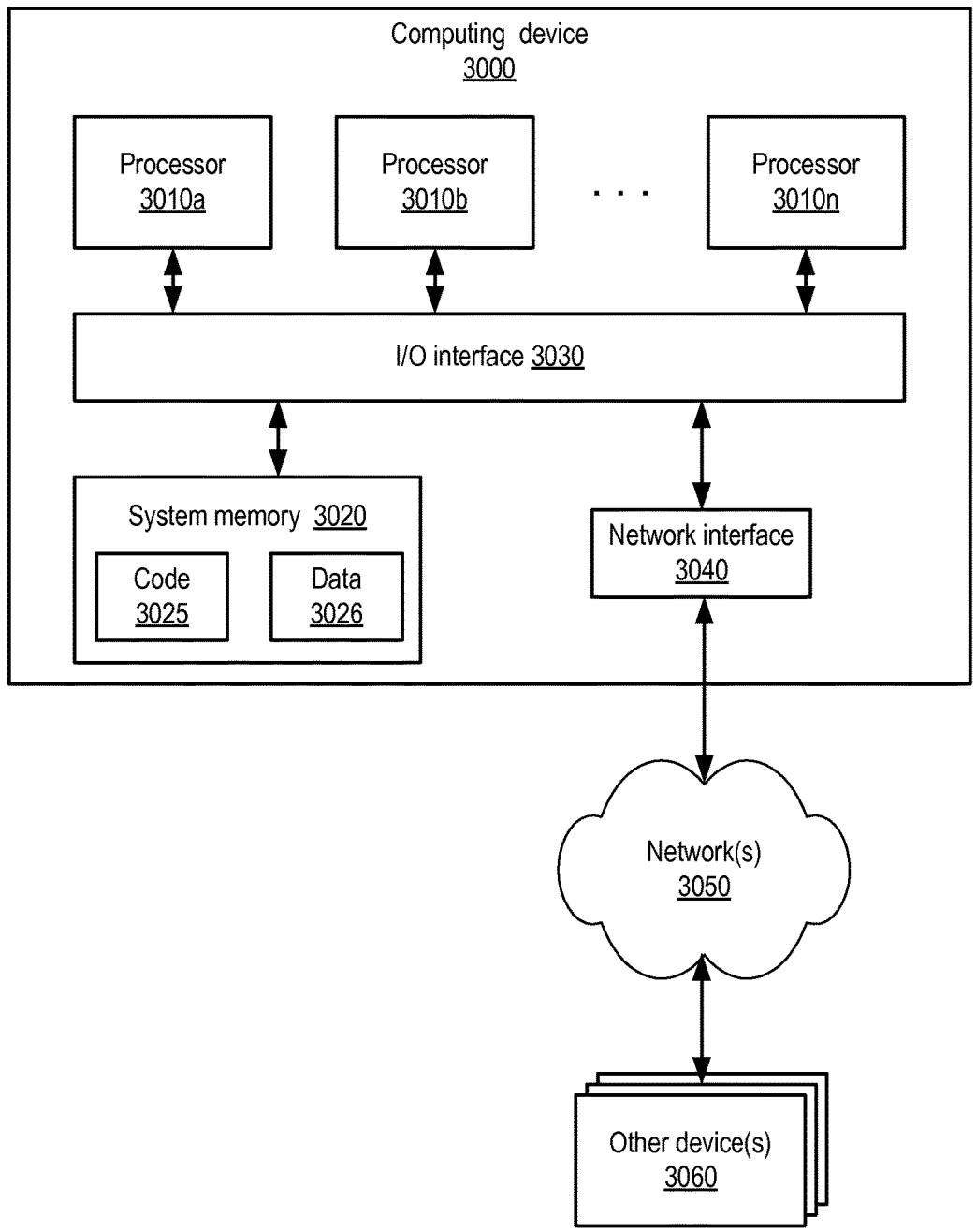
FIG. 9 is a block diagram illustrating an example computing device that may be used in at least some embodiments.

In at least some embodiments, a server that implements a portion or all of one or more of the technologies described herein, including the techniques to implement the access nodes, metadata nodes, storage nodes, workload information distributors and/or other components of a distributed file storage service, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, which may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of access nodes (ANs) of a file storage service implemented at a provider network, including a first AN in a first AN peer group (APG) collectively responsible for processing received client requests directed to at least a first file system instance;
wherein the first AN implements a plurality of load shedding analysis iterations (LSAIs), wherein a particular LSAI of the plurality of LSAIs comprises:
determining that a workload level associated with one or more persistent client connections (PCCs) meets a triggering condition for initiating load shedding, wherein each PCC of the one or more PCCs is established to process a plurality of client requests;

selecting at least a first PCC of the one or more PCCs as a candidate for termination;

examining a workload metric cache associated with the first APG, wherein the cache is populated based at least in part on one or more updates received from a workload information distributor, and wherein the cache comprises one or more metrics including at least a thread pool utilization metric of a different AN of the first APG;

determining, based at least in part on said examining, that one or more ANs of the APG meet an available-capacity criterion; and initiating, based at least in part on said determining that one or more ANs of the APG meet the available-capacity criterion, a phased termination of the first PCC, wherein the phased termination comprises allowing completion of in-flight requests on the first PCC, and rejecting new requests on the first PCC before the phased termination of the first PCC is completed.

2. The system as recited in claim 1, wherein a file system protocol implemented at the file storage service comprises one of: (a) a version of an NFS (Network File System) protocol or (b) a version of an SMB (Server Message Block) protocol.

3. The system as recited in claim 1, wherein said determining that the workload level meets the triggering condition comprises one or more of: (a) determining that a local thread pool utilization metric of the first AN exceeds a first threshold, (b) determining that a connection-count metric indicative of a number of active PCCs exceeds a second threshold, (c) determining that an aggregate throughput metric of the one or more PCCs exceeds a third threshold, (d) determining that a utilization metric of a resource utilized by the first AN exceeds a fourth threshold, wherein the resource includes one of: a processor, memory, a network device, a storage device, or a data structure, or (e) determining that a response time metric of the first AN exceeds a fifth threshold.

4. The system as recited in claim 1, wherein said determining that one or more ANs of the APG meet an available-capacity criterion comprises determining that at least a second AN of the first APG has one or more of: (a) a lower local thread pool utilization metric than the first AN, (b) a lower connection-count metric than the first AN, (c) a lower aggregate throughput metric than the first AN, (d) a lower resource utilization metric of a resource than the first AN, wherein the resource includes one of: a processor, memory, a network device, a storage device, or a data structure, or (e) a lower response time metric than the first AN.

5. The system as recited in claim 1, wherein said phased termination of the first PCC comprises performing, by the first AN:

issuing a request to close the first PCC subsequent to one or more of: (a) an expiration of a timeout interval, or (b) a determination that an in-flight request has been fulfilled using the first PCC, wherein processing of the in-flight request had been initiated prior to beginning the phased termination.

6. A method, comprising:

performing, by a first access node of a file storage service, wherein the first access node is a member of a first group comprising one or more access nodes responsible for processing received client requests directed to at least a first file system instance, a load shedding analysis, wherein the load shedding analysis comprises:

detecting that a workload level associated with one or more client connections meets a triggering condition for initiating load shedding, wherein the client connections are established to process a plurality of client requests;

determining, based at least in part on examining a workload metric cache comprising one or more metrics associated with other access nodes of the first group, wherein the one or more metrics include a thread pool utilization metric, that the first group meets an available-capacity criterion; and initiating, based at least in part on said determining that the first group meets an available-capacity criterion, a phased termination of at least a particular client connection of the one or more client connections, wherein the phased termination comprises allowing completion of in-flight requests on the particular client connection, and rejecting new requests on the particular client connection before the phased termination of at least the particular client connection is completed.

7. The method as recited in claim 6, wherein said determining that the first group meets an available capacity criterion comprises verifying that at least one metric stored in the workload metric cache was received within a particular time.

8. The method as recited in claim 6, wherein said detecting that the workload level meets the triggering condition comprises one or more of: (a) determining that a local thread pool utilization metric of the first access node exceeds a first threshold, (b) determining that a connection-count metric indicative of a number of active client connections exceeds a second threshold, (c) determining that an aggregate throughput metric of the one or more client connections exceeds a third threshold, (d) determining that a utilization metric of a resource utilized by the first access node exceeds a fourth threshold, wherein the resource includes one of: a processor, memory, a network device, a storage device, or a data structure, or (e) determining that a response time metric of the first access node exceeds a fifth threshold.

9. The method as recited in claim 6, wherein said determining that the first group meets the available-capacity criterion comprises determining that at least a second access node of the first group has one or more of: (a) a lower local thread pool utilization metric than the first access node, (b) a lower connection-count metric than the first access node, (c) a lower aggregate throughput than the first access node, (d) a lower resource utilization metric of a resource than the first access node, wherein the resource includes one of: a processor, memory, a network device, a storage device, or a data structure, or (e) a lower response time metric than the first access node.

10. The method as recited in claim 6, wherein said detecting that the workload level meets the triggering condition comprises utilizing a time-dependent decay function.

11. The method as recited in claim 6, wherein the first access node is a member of a second group, wherein the second group comprises one or more access nodes responsible for processing received client requests directed to at least a second file system instance, wherein at least one access node of the second group is not a member of the first group.

12. The method as recited in claim 11, wherein the first file system instance is established on behalf of a first customer of the file storage service, and wherein the second file system instance is established on behalf of a second customer of the file storage service.

13. The method as recited in claim 6, further comprising, performing by the first access node:
- transmitting a heartbeat message to one or more workload information distributors designated for at least the first group, wherein the heartbeat message includes workload metrics of the first access node;
- receiving a workload update message from a particular workload information distributor of the one or more workload information distributors, including a first workload update message indicating a utilization metric; and
- modifying the workload cache based at least in part on the first workload update message.

14. The method as recited in claim 6, further comprising:
- receiving, at a client component after said initiating the phased termination, an indication that the particular client connection has been closed;
- transmitting, by the client component, to a load balancer associated with the first group, a request to establish a replacement connection for the particular client connection; and
- selecting a particular one of the one or more access nodes of the first group to host the replacement connection.

15. The method as recited in claim 14, wherein the particular one of the one or more access nodes is the first access node.

16. A non-transitory computer-accessible storage medium storing program instructions that when executed on one or more processors implement a first access node of a distributed service, wherein the first access node is a member of a first group comprising one or more access nodes responsible for processing received client requests, wherein the first access node is configured to perform a load shedding analysis, wherein the load shedding analysis comprises:
- collecting one or more workload metrics pertaining to one or more members of one or more groups, including the first group;
- detecting, based at least in part on an analysis of the one or more workload metrics, that a triggering condition for initiating load shedding with respect to one or more client connections has been met, wherein the one or more client connections are established to process a plurality of client requests; and
- initiating, based at least in part on said detecting that a triggering condition for initiating load shedding with respect to one or more client connections has been met, a phased termination of at least a particular client connection of the one or more client connections, wherein the phased termination comprises allowing completion of in-flight requests on the particular client connection, and rejecting new requests on the particular client connection before the phased termination of at least the particular client connection is completed.

17. The non-transitory computer-accessible storage medium as recited in claim 16, wherein the one or more client connections include a plurality of client connections, wherein the first access node is configured to:
- select the particular client connection for phased termination based at least in part on one or more of: (a) a comparison of performance metrics of the plurality of client connections, or (b) random selection.

18. The non-transitory computer-accessible storage medium as recited in claim 16, wherein said detecting that the triggering condition has been met comprises one or more of: (a) determining that a local thread pool utilization metric of the first access node exceeds a first threshold, (b) determining that a connection-count metric indicative of a number of active client connections exceeds a second threshold, (c) determining that an aggregate throughput metric of the one or more client connections exceeds a third threshold, (d) determining that a utilization metric of a resource utilized by the first access node exceeds a fourth threshold, wherein the resource includes one of: a processor, memory, a network device, a storage device, or a data structure, or (e) determining that a response time metric of the first access node exceeds a fifth threshold.

19. The non-transitory computer-accessible storage medium as recited in claim 16, wherein the load shedding analysis comprises:
- determining, prior to initiating the phased termination, that the first group meets an available-capacity criterion.

20. The non-transitory computer-accessible storage medium as recited in claim 16, wherein said detecting that the triggering condition has been met comprises utilizing a time-dependent decay function.

21. The non-transitory computer-accessible storage medium as recited in claim 16, wherein the distributed service comprises a storage service implemented at a provider network.

22. The non-transitory computer-accessible storage medium as recited in claim 16, wherein said detecting that the triggering condition has been met comprises detecting an imbalance between respective workload levels of the first access node and a second access node of the first group.

* * * * *